US012681902B2

(12) United States Patent
Bhat et al.

(10) Patent No.: US 12,681,902 B2
(45) Date of Patent: *Jul. 14, 2026

(54) REMEDIATION OF UNSTRUCTURED DATA USING ARTIFICIAL INTELLIGENCE

(71) Applicant: Citibank, N.A., New York, NY (US)

(72) Inventors: Ganesh Prasad Bhat, West Orange, NJ (US); Ramee S. Karthikeyan, Monmouth Junction, NJ (US); Cameron Paul Lim, Union City, NJ (US); Alex Michael Eng, New York, NY (US); Subramanian Sankaran, Flushing, NY (US); Joshua Goldman, Merrick, NY (US); Matthew Ryan Mitsui, New York, NY (US); Wei Jie Ng, Jersey City, NJ (US); James Randolph Myers, Clearwater, FL (US); John E. Ortega, New York, NY (US); Alberto Cetoli, London (GB); Minjeong Cho, London (GB); Jason Ryan Engelbrecht, London (GB); Ines Teixeira, London (GB); Yael Man, Tel Aviv (IL)

(73) Assignee: CITIBANK, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/425,676

(22) Filed: Dec. 18, 2025

(65) Prior Publication Data

US 2026/0111395 A1 Apr. 23, 2026

Related U.S. Application Data

(63) Continuation of application No. 19/182,588, filed on Apr. 18, 2025, now Pat. No. 12,511,264, which is a (Continued)

(51) Int. Cl.
*G06F 16/00* (2019.01)
*G06F 16/174* (2019.01)
(Continued)

(52) U.S. Cl.
CPC ........ *G06F 16/1748* (2019.01); *G06F 16/345* (2019.01); *G06F 16/35* (2019.01)

(58) Field of Classification Search
USPC .......................................................... 707/692
See application file for complete search history.

(56) References Cited

U.S. PATENT DOCUMENTS 6,028,948 A 2/2000 Kil et al.
6,272,468 B1 8/2001 Melrose
(Continued)

FOREIGN PATENT DOCUMENTS

EP 1889153 A1 2/2008
WO 0184506 A2 11/2001
WO 0195266 A2 12/2001

OTHER PUBLICATIONS

Xue et al. (CN-115034580-A), "Quality Evaluation Method and Device of Fusion Data Set", Sep. 9, 2022, 26 Pages (Year: 2022).*
(Continued)

*Primary Examiner* — Bai D Vu
(74) *Attorney, Agent, or Firm* — Perkins Coie LLP

(57) ABSTRACT

The systems and methods disclosed herein obtain (e.g., via a user interface) a collection of unstructured data, where each document includes a content set. Using a first AI model set, multiple summaries are generated by categorizing each document into clusters based on vector comparisons of content sets and summarizing the content for each cluster. A second AI model set (same as or different from the first AI model set) identifies duplicate content within the unstructured data by generating similarity values between pairs of (Continued)

summaries and determining if the similarity values meet a predefined threshold. A report is generated (e.g., on the user interface) indicating the duplicate content sets and/or the collection of unstructured data.

20 Claims, 19 Drawing Sheets

Related U.S. Application Data continuation-in-part of application No. 19/050,084, filed on Feb. 10, 2025, now Pat. No. 12,430,308, which is a continuation-in-part of application No. 18/736,407, filed on Jun. 6, 2024.

(51) Int. Cl.
*G06F 16/34* (2019.01)
*G06F 16/35* (2019.01)

(56) References Cited

U.S. PATENT DOCUMENTS 7,322,024 B2 1/2008 Carlson et al.
8,412,813 B2 4/2013 Carlson et al.
9,712,576 B1 7/2017 Gill
9,836,664 B1 12/2017 Ramaswamy et al.
11,509,730 B1 11/2022 Peebles et al.
11,922,357 B2 3/2024 Niyazov et al.
11,972,223 B1 4/2024 Defoor et al.
2002/0143692 A1 10/2002 Heimermann et al.
2002/0178039 A1 11/2002 Kennedy
2003/0009355 A1 1/2003 Gupta
2003/0033191 A1 2/2003 Davies et al.
2003/0139907 A1 7/2003 Mccarthy
2003/0171657 A1 9/2003 Leonard et al.
2006/0165040 A1 7/2006 Rathod et al.
2006/0248121 A1 11/2006 Cacenco et al.
2007/0009160 A1 1/2007 Loo et al.
2010/0324951 A1 12/2010 Northover
2014/0355835 A1 12/2014 Rodriguez-Serrano et al.
2014/0362919 A1 12/2014 Zhou et al.
2016/0267359 A1 9/2016 Gan et al.
2018/0083825 A1 3/2018 Prabhakara et al.
2019/0257979 A1 8/2019 Hyland
2020/0192906 A1 6/2020 Visscher
2021/0103580 A1 4/2021 Schierz et al.
2021/0150364 A1 5/2021 Mixter
2021/0374562 A1 12/2021 Chang et al.
2022/0107645 A1 4/2022 Kalantidis et al.
2022/0253592 A1 8/2022 Rao et al.
2023/0077289 A1 3/2023 Sloane et al.
2023/0105021 A1 4/2023 Shah et al.
2023/0229738 A1 7/2023 Cleere et al.
2023/0410483 A1 12/2023 Chen et al.
2024/0135256 A1 4/2024 Seo et al.
2024/0169272 A1 5/2024 Macwilliams et al.
2024/0290065 A1 8/2024 Park et al.

OTHER PUBLICATIONS

Beltrame, Mirco, "RedactBuster: Entity Type Recognition from Redacted Documents,", arXiv preprint arXiv:2404.12991, Apr. 2024, 20 pages.

Beraldi, Lorenzo, "Learning to Mask and Permute Visial Tokens for Vision Transformer Pre-Training", arXiv preprint arXiv:2306.07346, 2023, 16 pages.

Meng, Jian, "Contrastive Dual Gating: Learning Sparse Features With Contrastive Learning", Proceedings of the IEEE/CVF Conference on Computer Vision and Pattern Recognition (CVPR), 2022, 9 pages.

Rezaeifar, Shideh, "Privacy-Preserving Image Template Sharing Using Contrative Learning", Entropy 2022, 2022, 16 pages.

* cited by examiner

100

Compliance Report 120

Modified Dataset 122

· · ·

Data Management Platform 104

Information Extraction Engine 118

Remediation Engine 116

Rule Generation Engine 114

Root Cause Evaluation Engine 112

Anomaly Detection Engine 110

Threshold Modeling Engine 108

Data Profiling Engine 106

Dataset 102

400

402

Obtain a plurality of unstructured data, each unstructured document of the plurality of unstructured data including a content set

404

Generate, using a first artificial intelligence (AI) model set, multiple summaries defining the plurality of unstructured data

406

Identify, using a second AI model set, at least one duplicate content set between one or more pairs of summaries within the multiple summaries by generating a similarity value by comparing the content sets corresponding to the one or more pairs of summaries

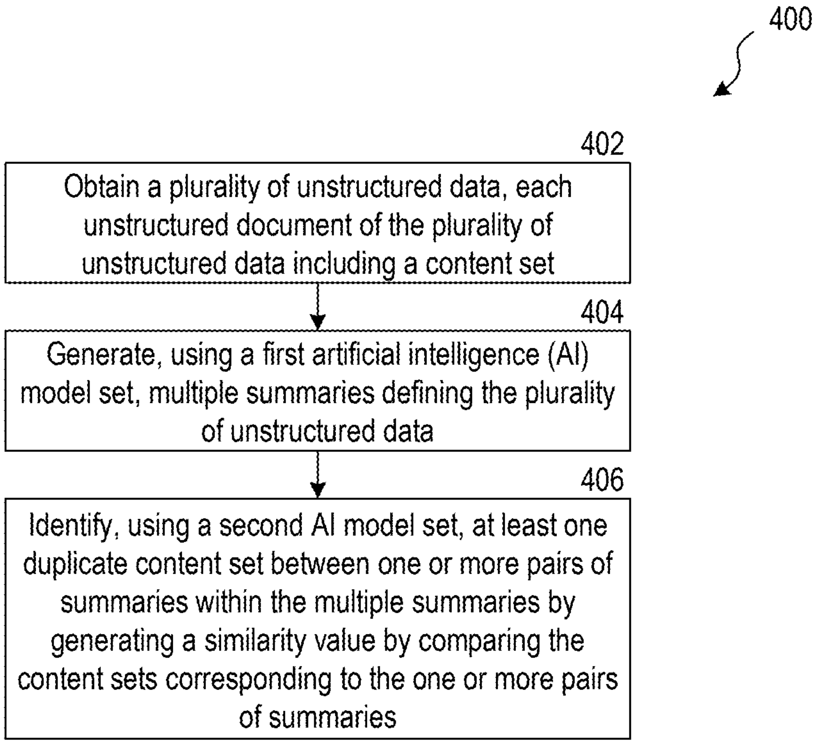

*FIG. 4*

| IDENTIFIER | count | length |
|---|---|---|
| XXXXXXXXXX | 134488 | 10 |
| | 91495 | 0 |
| XXXXX | 2007 | 5 |
| XXXXXX | 441 | 6 |
| XXXXXXX | 5 | 7 |

800

Association Rules Anomalies

802 → IF V_1 = 97 AND V_2 = 8811 AND V_3 = 4 AND V_4 = INDO

804 → THEN V_5 = 26 AND V_6 = 814110

| ID | V_1 | V_2 | V_3 | V_4 | V_5 | V_6 | V_7 |
|----|-----|-----|-----|-----|-----|-----|-----|

IF V_8 = L AND V_3 = 4 AND V_1 = 97 AND V_9 = "RETAIL" AND V_10 = 99999999.0 AND V_11 = 99999999.0

THEN V_12 = 9930

| ID | ACCOUNT_TYPE | SUPER_GROUP_CODE | NAICS | PERSON_PARTY_CLASS | ORIG | ORIG_1 |
|----|--------------|------------------|-------|--------------------|------|--------|

1000

1002

Receive a structured dataset including an observed set of values for each variable in a set of variables

1004

Identify a set of anomalies in the observed set of values of one or more variables in the structured dataset

1006

Evaluate the identified set of anomalies

1008

Generate a set of reconfiguration commands to remove the identified set of anomalies

1010

Automatically execute the set of reconfiguration commands on the structured dataset

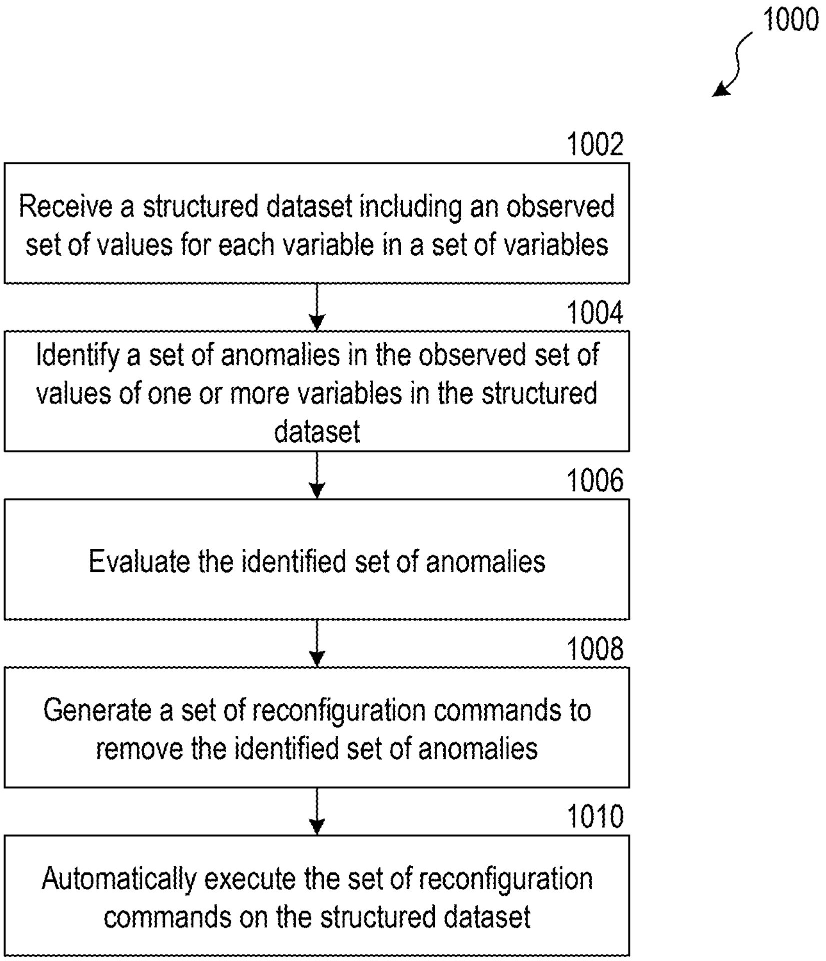

Extract a set of features from a training document for training a machine learning model

1604

Select a first subset of features to omit from at least one training forward propagation

1606

Train the machine learning model to classify documents and differentiate between an out-of-distribution document and an in-domain document

1608

Receive a document as input data to the machine learning model

1610

Receive a classification of the document as output of the machine learning model

1612

Receive a classification of the document as output of the machine learning model

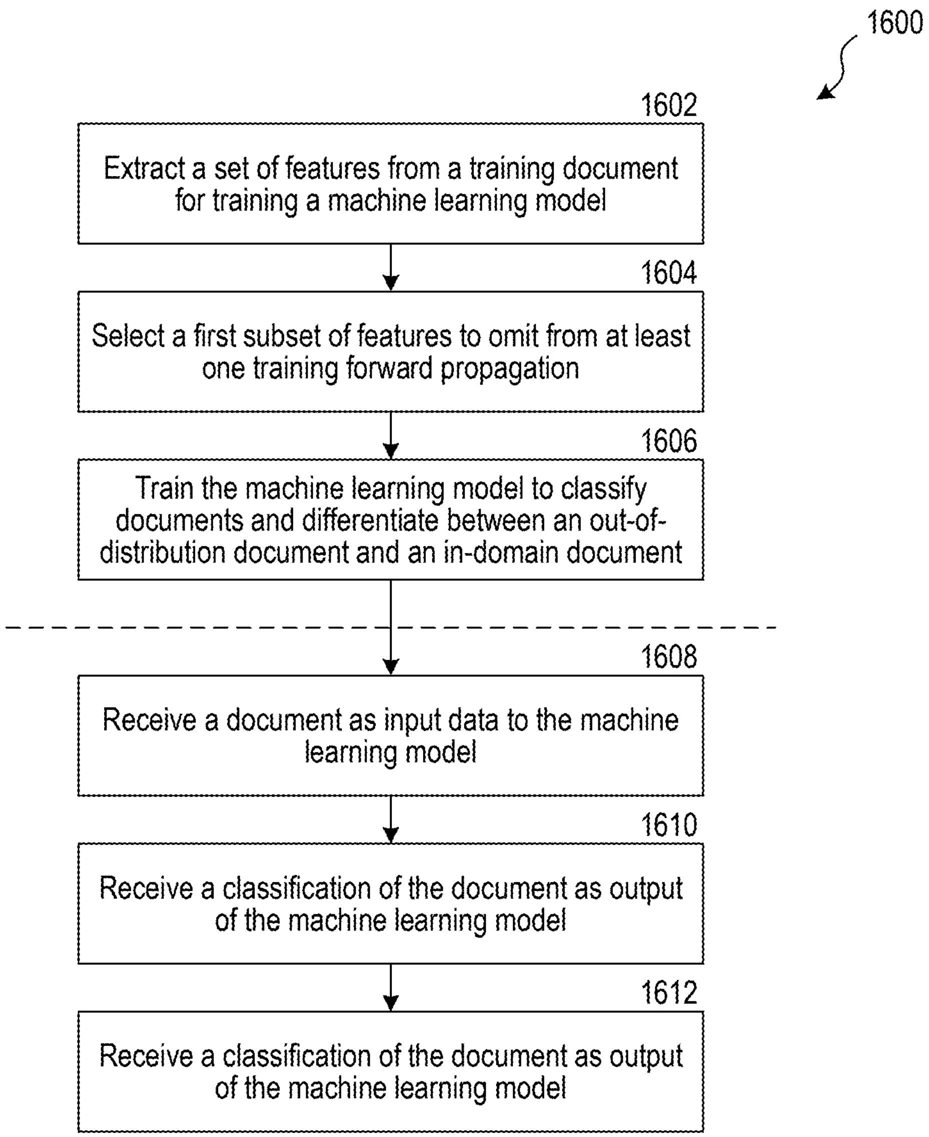

*FIG. 16*

REMEDIATION OF UNSTRUCTURED DATA USING ARTIFICIAL INTELLIGENCE

CROSS-REFERENCE TO RELATED APPLICATION(S)

This application is a continuation application of U.S. patent application Ser. No. 19/182,588 entitled "DETECTING DATA ANOMALIES ARTIFICIAL INTELLIGENCE" and filed Apr. 18, 2025, which is a continuation-in-part of U.S. Pat. No. 19,050,084 entitled "DETECTING DATA ANOMALIES USING ARTIFICIAL INTELLIGENCE" and filed Feb. 10, 2025, which is a continuation-in-part of U.S. patent application Ser. No. 18/736,407 entitled "OUT-OF-DISTRIBUTION PREDICTION" and filed Jun. 6, 2024. The content of the foregoing applications is incorporated herein by reference in its entirety.

BACKGROUND

Unstructured data refers to information that does not have a predefined data model or is not organized in a predefined manner. In practice, organizations rely on large amounts of unstructured data (e.g., operational guidelines, compliance manuals, procedural documentation, and so forth) to maintain operational consistency and/or train artificial intelligence models to make predictions based on up-to-date data. The accuracy, completeness, and reliability of this unstructured data directly impact an organization's ability to maintain efficient operations, make informed decisions, and uphold competitive advantages in increasingly documentation-driven environments. Thus, poor management of unstructured data (e.g., containing duplicate or contradictory information) can result in increased operational, financial, and regulatory consequences for organizations.

BRIEF DESCRIPTION OF THE DRAWINGS

FIG. 4 is a flow diagram illustrating an example process of remediating anomalies using the data management platform of FIG. 1.

FIG. 10 is a flow diagram illustrating an example process of remediating anomalies using the data management platform of FIG. 1.

FIG. 16 is a flowchart that illustrates an example of the out-of-distribution prediction engine that trains a machine learning model to identify whether a data object is out-of-distribution.

DETAILED DESCRIPTION

Figure 1:
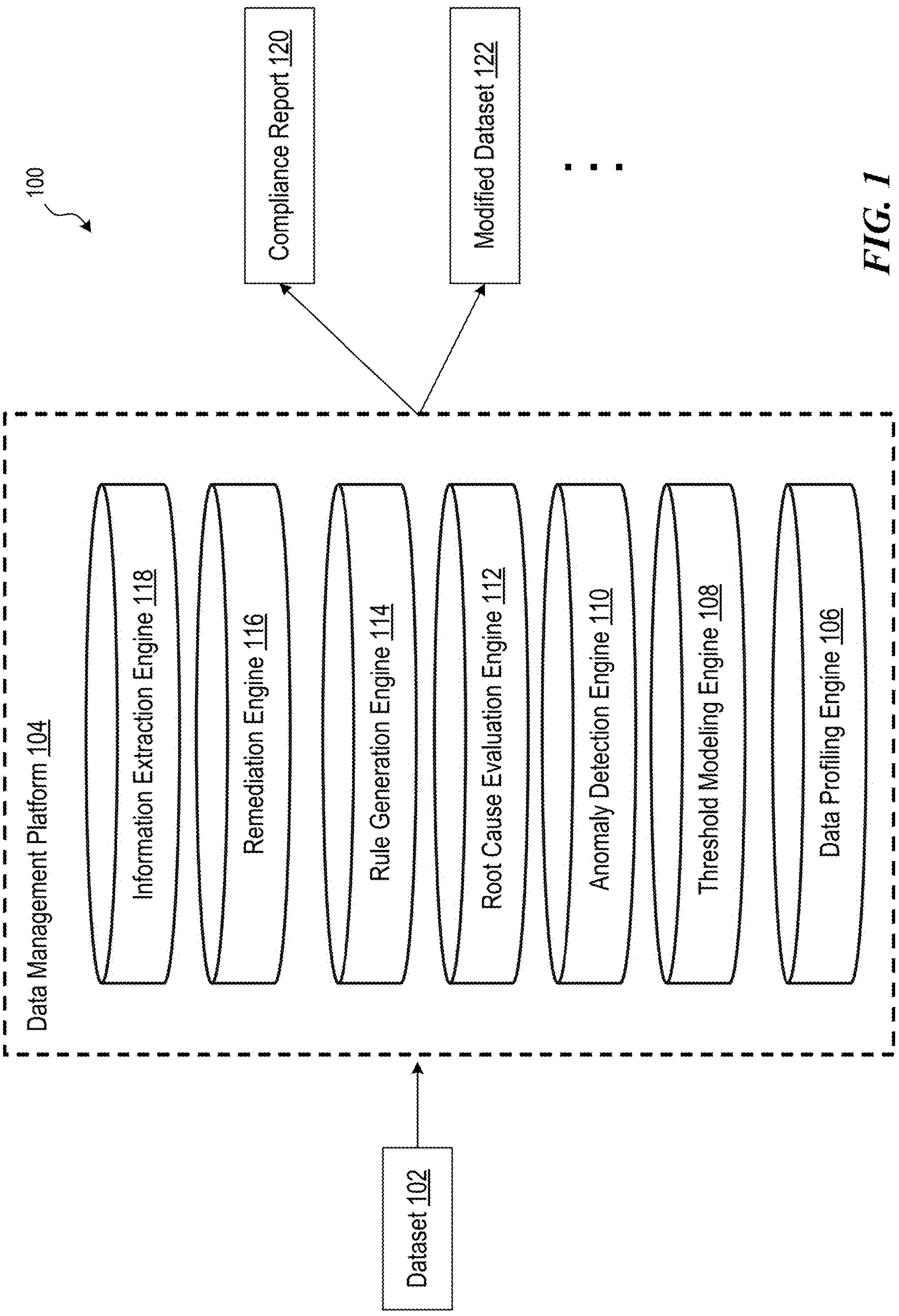
FIG. 1 illustrates an example environment of the data management platform for improving the data quality of a dataset.

In today's data-driven world, organizations across various industries rely heavily on data to train artificial intelligence (AI) models to make informed decisions, modify operations, and so forth. However, organizations often face the problem of managing large amounts of unstructured data, which can include redundant or conflicting information. Unstructured data refers to information that does not have a predefined data model or is not organized in a predefined manner (e.g., with structured fields), such as text documents, emails, chat logs, images, or voice recordings. Poor management of unstructured data can lead to inefficiencies, increased operational costs, and compliance issues. Cleaning up such unstructured data is a complex and resource-intensive task, as it typically requires identifying and resolving redundancies, inconsistencies, and inaccuracies in data that cannot be easily identified and sorted. The challenge is further compounded by the fact that unstructured data is often vast and across distributed systems, making it difficult to standardize and organize effectively.

Further, unstructured data available to these organizations often includes anomalies such as duplicative content and/or knowledge conflicts within datasets. Anomalies refer to any type of inconsistency with expected data, including deviations, outliers, errors, or irregular patterns that do not conform to the established norms or expected values within a dataset. Duplicate content refers to repeated information and can come from various sources, such as multiple versions of documents, repeated entries, redundant information, and so forth. Knowledge conflicts refer to situations where there are contradictions or inconsistencies within the information contained in different documents. Knowledge conflicts can arise when two or more documents provide differing or opposing information on the same topic. For example, one document may state that a particular procedure should be performed using steps A, B, and C, while another document may describe a different method of steps B, D, and E for the same procedure.

Training AI model(s) on data with duplicates risks the AI model(s) performing well on training data but poorly on new, unseen data because the model has learned the duplicates (i.e., receiving more positive reinforcement on duplicative data) rather than the true underlying patterns, which results in reduced generalization ability and accuracy of the AI model. Further, training AI model(s) using data with knowledge conflicts results in the AI model(s) learning conflicting or contradictory rules, which further deteriorates its performance on new, unseen data. The presence of such conflicts confuses the model, preventing it from establishing consistent, reliable patterns in the data and thus reducing its overall effectiveness and predictive accuracy. For instance, in the financial sector, redundant/conflicting transaction data can result in erroneous risk assessments.

In addition, organizations often face the problem of storing large amounts of unusable "polluted" data, including anomalies that are reflective of social biases at the time the data was collected. Historical data often contain biases that, once ingested into AI models (e.g., to train the AI model), can perpetuate and even amplify these historical biases, which may lead to unfair and/or discriminatory outcomes. Cleaning up such polluted data is a complex and resource-intensive task, as it requires identifying and correcting inaccuracies, filling in missing information, addressing embedded biases, and so forth. The challenge is further compounded by the fact that once biased data is used to train AI models, it can be difficult to remove the influence of these biases.

Further, training data available to these organizations often includes anomalies such as excessive noise within datasets. Noise in data refers to irrelevant or random information that is not useful for the intended task (e.g., of the AI model) and can obscure the underlying patterns. Noise can come from various sources, such as errors in data collection, transmission, or entry, and can include outliers, missing values, irrelevant features, and so forth. Training AI models on data with noise is challenging because the models may learn to recognize and replicate these irrelevant patterns, leading to overfitting.

Moreover, a machine learning system may provide inaccurate information when presented with documents that are out-of-distribution from the types of documents used to train the machine learning model. For example, current machine learning systems may misclassify documents that have similarities to, but are actually different from, documents in the training data. This occurs partly because the prediction capabilities of current machine learning models are limited by the initial training data, which results in machine learning models that give too much weight to less-significant features in the data.

Attempting to create a system that manages unstructured data presented significant technical challenges. Developing such a system required addressing several limitations in conventional approaches to data management, such as the difficulty in identifying and resolving inconsistencies within large volumes of unstructured data. Traditional data management systems ingest structured data and are inadequate for managing the dynamic and unpredictable nature of unstructured data frequently required by modern computing environments. Static rule-based or template-based approaches may fail to account for the potential wide range of different data remediation tasks across different data sources. As a result, conventional methods often lead to inefficient resource utilization and inaccuracies (e.g., failing to identify anomalies) when managing unstructured data.

To address these technical challenges, multiple design approaches were evaluated. For example, one approach included inputting the "polluted data" directly into an AI model as training data without remediating the unstructured data (e.g., removing duplicates or resolving knowledge conflicts), and relying on the AI model's ability to resolve the inconsistencies within the "polluted data." However, the presence of anomalies such as duplicate content and/or conflicting information would lead to inaccurate predictions and reduce the overall accuracy and reliability of the AI model, since the AI model was trained and/or fine-tuned on inaccurate data. Another approach included manually reviewing and cleaning the unstructured data before inputting the data into the AI model. While this method improved data quality, manually reviewing unstructured data is highly labor-intensive and time-consuming, making it impractical for large datasets.

Both the direct input and manual cleaning approaches proved to have significant limitations. The direct input approach, while flexible in handling different types of data, results in suboptimal performance and resource utilization when confronted with queries or requests associated with particular portions of the data that contain anomalies such as duplicates and knowledge conflicts. Conversely, the manual cleaning approach, although effective in improving data quality, lacks the efficiency and scalability to handle large volumes of unstructured data. The labor-intensive nature of manual cleaning is particularly challenging when attempting to perform tasks that require accessing and/or evaluating data across different distributed data sources.

As such, the inventors have developed a system for remediating unstructured data using an AI model (hereinafter the "data management platform"). The data management platform obtains (e.g., via a user interface) a collection of unstructured data (e.g., text files, emails, chat logs, images, voice recordings), where each document includes a content set. Using a first AI model set, multiple summaries of the unstructured data are generated by categorizing each document into clusters by performing vector comparisons of content sets and summarizing the content for each cluster. For example, documents with similar content can be grouped into the same cluster. A second AI model set (the same as or different from the first AI model set) identifies duplicate content within the unstructured data by generating intermediate similarity values for each pair of summaries (e.g., the distance between their vector representations). If the intermediate similarity value meets a first predefined threshold, an overall similarity value can be generated by comparing the content sets of the pairs of summaries. The data management platform then determines if the overall similarity value meets a second predefined threshold to identify duplicates. Additionally, the data management platform can identify content conflicts (e.g., knowledge conflicts) between pairs of summaries by mapping summaries to topics and information sets and comparing their vector representations. If summaries sharing a common topic include information sets with a degree of similarity failing a predefined threshold, the data management platform can flag the pair of summaries with a knowledge conflict.

Once the duplicate content and/or knowledge conflicts are identified, the data management platform generates a reconfiguration command set using a third AI model set. This command set is configured to remove the duplicate content/knowledge conflicts from the unstructured data. For example, the data management platform identifies the unstructured documents corresponding to the duplicate content/knowledge conflicts and selects portions of these documents by mapping them to a predefined ranked rule set. This rule set ranks the documents based on criteria such as timestamp, author, version, or status. The data management platform can automatically execute the reconfiguration command set to modify the selected portions of the documents, effectively removing the duplicate content. Furthermore, the data management platform can categorize summaries into intermediate and overall category sets based on the degree of similarity between their vector representations to organize the data and improve its usability. The data management platform can generate a report, which can be displayed on the user interface. The report indicates the identified duplicate content and/or knowledge conflicts and the collection of unstructured data.

Further, the data management platform is enabled to improve data quality (e.g., reducing anomalies) using an AI model. The data management platform receives a dataset including an observed set of values for a set of variables. The data management platform can use a first set of AI models (e.g., embedding model, non-generative model, generative model, large language model, AI model) to identify a set of anomalies (e.g., noise, missing values, biases, and so forth) in the observed set of values by comparing an observed set of patterns (e.g., expected distributions, expected values, and so forth) against multiple reference patterns (e.g., expected distributions, expected values, and so forth). The data management platform can use a second set of AI models (same as or different from the first set of AI models) to evaluate the identified anomalies by comparing an observed set of association rules (e.g., "if/then" statements characterizing the observed set of values) with an expected set of association rules (e.g., "if/then" statements characterizing an expected set of values). The data management platform can use a third set of AI models (same as or different from the first and/or second set of AI models) to generate reconfiguration commands to remove the identified anomalies. The reconfiguration commands can be automatically executed to modify the observed association rules to align with the expected association rules.

In addition, the data management platform is enabled to determine whether input data of a machine learning model is out-of-distribution data by training a machine learning (ML) model with masked training data and providing masked input data to the trained machine learning model. Users of the systems may mistakenly upload input data that includes irrelevant documents that are significantly different from "in-domain" data, which the machine learning model has been trained to predict. In this disclosure, a robust outlier detection is implemented that allows an out-of-distribution prediction engine to identify such outliers and subsequently send the outliers for manual review. In at least one implementation, an out-of-distribution prediction engine detects outlier data by randomly masking portions of training data, which results in a machine learning model that assigns more weight to the most important features in the data. In at least one implementation, the masking of training data results in a greater difference between vectors of relevant data versus irrelevant data, making it easier to identify when irrelevant data, such as an incorrect document, is input into the machine learning model. Techniques described and suggested in the present disclosure are necessarily rooted in computer technology in order to overcome problems specifically arising with the computing resources required by machine learning models to generate predictions and detect outliers that are irrelevant to the machine learning model operations and send the outliers for manual review.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data management platform can evaluate data using support vector machine (SVM), k-nearest neighbor (KNN), decision-making, linear regression, random forest, naïve Bayes, logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase, which is included in at least one implementation of the present technology and can be included in more than one implementation. In addition, such phrases do not necessarily refer to the same implementations or different implementations.

Overview of the Data Management Platform

FIG. 1 illustrates an example environment 100 of a data management platform 104 for improving data quality of a dataset. Environment 100 includes dataset 102, data management platform 104, compliance report 120, and modified dataset 122. Implementations of example environment 100 can include different and/or additional components or can be connected in different ways.

The dataset 102 can include structured and/or unstructured data. Structured data refers to data organized in a predefined manner, such as databases or spreadsheets (e.g., in rows and columns, in a graph, and so forth), while unstructured data refers to data without a predefined data model, such as emails, multimedia files, and other free-form documents. For example, a company's customer database can include structured data, such as customer identifiers and transaction records, while unstructured data includes customer feedback emails. The data management platform 104 ingests the dataset 102 and performs one or more validation checks on the dataset 102. The data management platform 104 can be cloud-based or stored on a local server. The validation actions performed by the data management platform 104 in FIG. 1 can be executed by data profiling engine 106, threshold modeling engine 108, anomaly detection engine 110, root cause evaluation engine 112, rule generation engine 114, remediation engine 116, and/or information extraction engine 118.

The data profiling engine 106 can identify dataset's 102 structure, data types, and/or indicate one or more attributes/features of the dataset 102 (e.g., typos, wrong format, out of range values). The data profiling engine 106 can, using the variables and observations within dataset 102, automatically identify attributes of the dataset 102, such as the number of records, field types (e.g., integers, floats, strings), variables, variable values, and/or frequency distributions. In some implementations, the data profiling engine 106 determines the features of each variable (i.e., univariate). For numerical data, the data profiling engine 106 can calculate mean, median, standard deviation, interquartile range, and so forth.

For categorical data, the data profiling engine 106 can calculate the number of categories, the number of observations in each category, and so forth. Using the identified features, the data profiling engine 106 can, in some implementations, identify one or more anomalies of the dataset 102 in one or more variables. For example, the data profiling engine 106 can identify values beyond a certain SD from the mean. The thresholds used in determining anomalies can be configurable by a user (e.g., by defining the threshold SD, threshold variance, combination threshold that requires satisfying both the threshold SD and the threshold variance, etc.). For example, the data profiling engine 106 can detect that customer birth dates are missing in a certain percentage of records.

In some implementations, data profiling engine 106 can identify metadata within dataset 102 associated with data lineage and/or versioning to monitor transformations of data within dataset 102. Further methods of identifying attributes/features of the dataset are discussed with reference to FIG. 10. In some implementations, the data profiling engine 106 can generate an output file (e.g., text, image, audio, video, multi-modal) indicating the identified structure, data types, and/or one or more features of the dataset 102 (e.g., on a graphical user interface). The data profiling engine 106 can be data agnostic, meaning that the data profiling engine 106 does not use prior context or knowledge about the dataset 102 to identify the dataset's 102 features. In some alternative implementations, the data profiling engine 106 could be data discerning whereby the data profiling engine applies prior context or knowledge about the dataset 102 to more rapidly identify the dataset's features.

The threshold modeling engine 108 can identify one or more anomalies by dynamically generating thresholds and/or setting static thresholds for particular data attributes (e.g., variable values, means, SD, interquartile range, and so forth) determined by the data profiling engine 106. For example, the threshold modeling engine 108 can identify anomalies in seasonal attributes based on historical data using univariate analysis by determining thresholds (e.g., ranges of variable values) during different times. The threshold modeling engine 108 can use historical data to establish baseline patterns (e.g., using an autoregressive integrated moving average (ARIMA) model) and continuously update the thresholds at various intervals, e.g., as new data (e.g., dataset 102) is ingested, at preset time intervals, or at preset data quantities. By using historical data, the threshold modeling engine 108 can account for expected variations and seasonal trends, reducing the likelihood of false positives.

The anomaly detection engine 110 can detect univariate and/or multivariate anomalies within dataset 102. The anomaly detection engine 110 can flag transactions that deviate significantly from established thresholds or exhibit unusual correlations (e.g., indicating potential errors) using methods discussed with reference to FIG. 10. The anomaly detection engine 110 can use one or more anomaly detection modeling techniques, such as clustering, regression analysis, anomaly score computation, and so forth, to identify outliers. The anomaly detection engine 110 can assign one or more anomaly scores for each data point in dataset 102 and compare the score against the established thresholds to determine if an anomaly exists. In some implementations, the anomaly detection engine 110 uses a majority vote between multiple models to assign the anomaly score. Methods of detecting anomalies within unstructured data are discussed in further reference to FIGS. 2-4. Methods of using an out-of-distribution prediction engine within the anomaly detection engine 110 that trains a machine learning model to identify whether a data object is out-of-distribution is discussed in further reference to FIGS. 11-15.

In some implementations, anomalies detected by the anomaly detection engine 110 can use predefined context or knowledge bases. The context or knowledge bases can be tailored to the specific use case or application of dataset 102, such as appending dataset 102 to another dataset. A use case refers to a specific situation or scenario in which the dataset 102 is applied to achieve a particular goal (e.g., resolving missing values) or solve a specific problem (e.g., whether two datasets belong to the same corpus). For instance, an anomaly in dataset 102 can be identified if the data of dataset 102 exceeds a certain standard deviation threshold value from a reference dataset, indicating that the dataset 102 potentially fails to belong to the same corpus (e.g., group of artifacts, group of documents) as the reference dataset. In some implementations, the threshold value is configurable by a user of the data management platform 104. For example, the user can select how many degrees of standard deviation should be allowed when determining if an observed set of values belongs to the same corpus as another set of values. If the standard deviation of both the observed set of values and the other set of values exceeds the user-defined standard deviation threshold, the observed values can be raised as an anomaly.

The root cause evaluation engine 112 can identify one or more events associated with (e.g., causing, linked to, mapped to) the anomalies using correlations between or among values of different data variables in the dataset 102 and identifying sequence patterns that precede anomalies. For instance, the root cause evaluation engine 112 can identify that a particular system error during data entry leads to inconsistencies in the dataset 102. The root cause evaluation engine 112 can use techniques such as causal inference, dependency analysis, and/or sequence mining to trace the anomaly back to its source. The source of an anomaly can be a specific variable or multiple variables within the dataset. For instance, an anomaly can be traced back to a single variable that is significantly higher or lower than the expected range. Alternatively, the source can include multiple variables that together form a pattern indicative of, for example, data entry errors, system errors, hardware malfunctions, and so forth.

In some implementations, the rule generation engine 114 can automatically generate/formulate association rules based on historical data patterns and observations. The association rules define expected data behaviors and relationships of dataset 102. For example, an association rule can state that if a value of a variable exceeds a certain threshold, the value of a different variable is of a certain category. Further methods of determining root causes of detected anomalies are discussed with reference to FIG. 8 and FIG. 10.

The remediation engine 116 can generate one or more actions (e.g., workflows, computer-executable tasks) to remediate anomalies. The actions can include data correction, alert generation, or perform one or more computer-executable tasks to rectify data inconsistencies. For instance, the remediation engine 116 can automatically correct data mismatches by referencing a master data source or filling in missing values of a dataset using predicted values. In conjunction or alternatively, the remediation engine 116 can use one or more predefined rules, machine learning models, and so forth to recommend and/or implement remediation actions upon user authorization. In some implementations, remediation engine 116 can integrate with external workflow management systems to automate remediation processes involving multiple tasks.

The modified dataset 122 refers to the dataset 102 after the remediation actions are performed on the dataset 102. In some implementations, modified dataset 122 can include enriched data, where missing values are imputed, or additional context is added based on reference data sources. The data management platform 104 can track changes to maintain a history of data modifications for audit purposes. The compliance report 120 can be generated by the data management platform 104 to document the compliance status of dataset 102 with specified data quality standards/guidelines/regulations. The compliance report 120 can include identified anomalies, remediation actions, data quality metrics, version, and so forth.

In some implementations, the information extraction engine 118 can extract data from unstructured sources and use dataset 102 to determine anomalies within the unstructured source and/or the dataset 102. For example, the information extraction engine 118 can use natural language processing (NLP) techniques and other methods discussed with reference to FIG. 10 to parse text, recognize entities, and transform unstructured data into a structured format. In some implementations, information extraction engine 118 can ingest text, audio, images, videos, and so forth.

Remediating Unstructured Data Using the Data Management Platform

Figure 2:
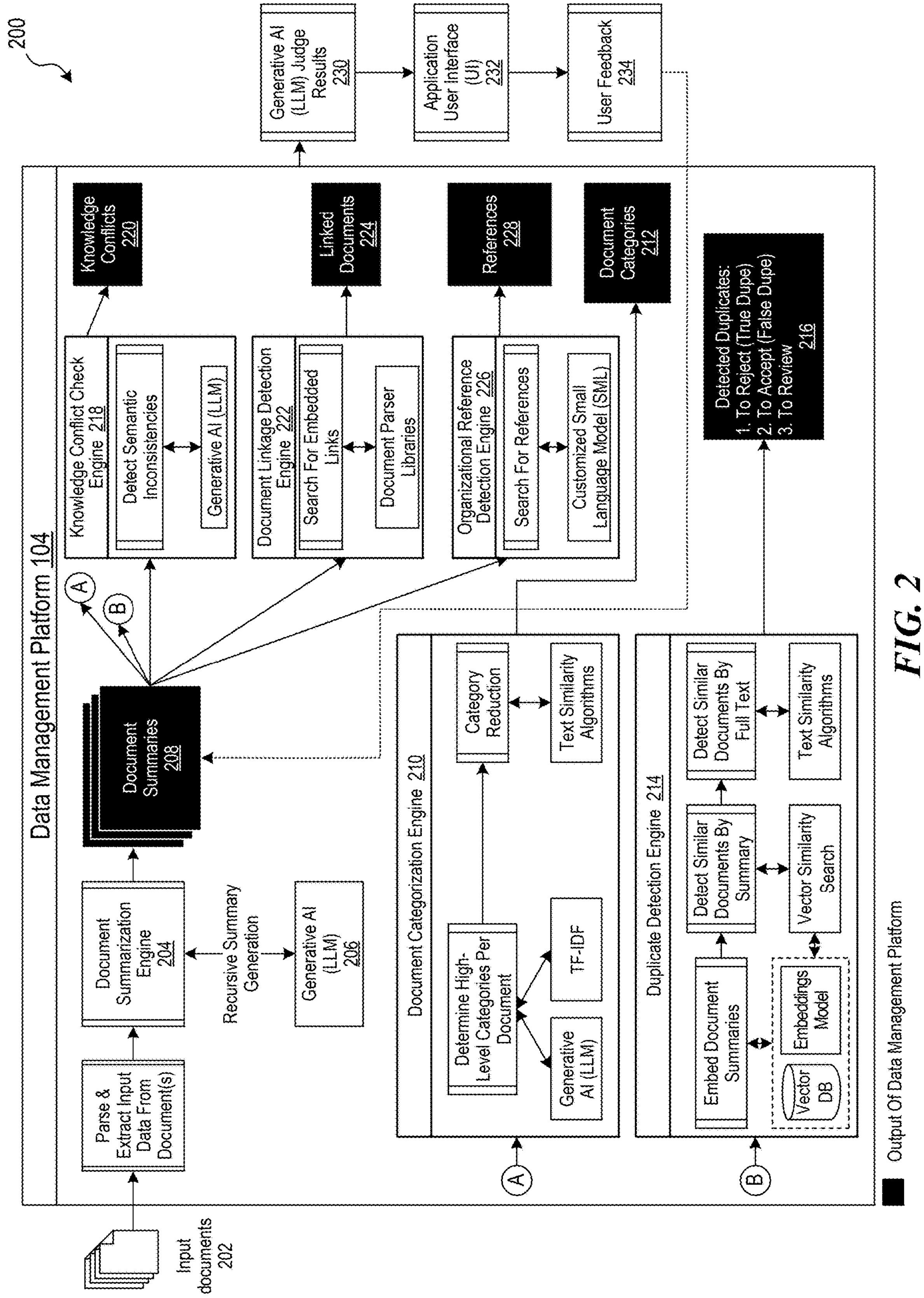
FIG. 2 illustrates an example environment of the data management platform of FIG. 1 for remediating unstructured data.

FIG. 2 illustrates an example environment 200 of the data management platform 104 of FIG. 1 for remediating unstructured data. Environment 200 includes input documents 202, a summarization engine 204 that uses an AI model 206 to output summaries 208, a categorization engine 210 that outputs categories 212, a duplicate detection engine 214 that outputs duplicates 216, a knowledge conflict check engine 218 that outputs knowledge conflicts 220, a linkage detection engine 222 that outputs linked documents 224, an organizational reference engine 226 that outputs organizational references 228, results 230, a user interface 232, and user feedback 234. Implementations of example environment 200 can include different and/or additional components or can be connected in different ways. The different engines of environment 200 can be performed in parallel by, for example, separate AI models (e.g., agentic models). Though example environment 200 describes remediating unstructured documents, the data management platform 104 can similarly remediate unstructured data of any sort, including, but not limited to, audio data, image data, video data, and so forth. Methods of remediating unstructured data of different modalities are discussed in further detail with reference to FIG. 4.

The input documents 202 can represent a collection of unstructured data (or a mix of structured and unstructured data) that the data management platform 104 ingests via, for example, a user interface (e.g., the user interface 232). In some implementations, the input documents 202 are received from a computer system separate from one associated with the user interface 232. The input documents 202 can include various types of data such as text files, emails, chat logs, images, voice recordings, and so forth. In some implementations, the input documents 202 can include multimedia files and other free-form documents that lack a predefined data model.

The summarization engine 204 within the data management platform 104 uses an AI model 206 (e.g., a non-generative AI model, a generative AI model, a machine learning model, an LLM, and so forth) to generate summaries 208 of the input documents 202. The summarization engine 204 can, for example, categorize the input documents 202 into clusters based on vector comparisons of content within the documents. Methods of summarizing the documents are discussed in further detail with reference to FIG. 4. The summaries 208 provide a condensed version of the content to enable the data management platform 104 to remediate or otherwise process large volumes of unstructured data. In some implementations, the summarization engine 204 can use different AI models for different types of documents (e.g., a text-based model for text documents, an image-based model for images, and so forth).

The categorization engine 210 within the data management platform 104 can use the summaries 208 generated by the summarization engine 204 and categorize the summaries 208 into categories 212. The categorization engine 210 can group the summaries 208 based on their respective content. In some implementations, the categorization engine 210 uses predefined categories. In other implementations, the categorization engine 210 dynamically generates categories that reflect the themes present in the documents. The categorization engine 210 uses, for example, one or more AI models (e.g., ML models) to identify patterns and similarities in the documents (e.g., by determining a distance between vector representations of the documents) and group related summaries 208 together.

The categorization engine 210 can use one or more generative AI models (e.g., large language models (LLMs)) and/or term frequency-inverse document frequency (TF-IDF) algorithms to categorize the documents. Generative AI models can identify, for the input documents 202, concepts, entities, and the relationships between them and thus suggest categories based on the context and content of the documents. The data management platform 104 can additionally or alternatively determine the term frequency (TF)—the number of times a term appears in a document, weighted against the inverse document frequency (IDF)—which measures how common or rare a term is across the entire dataset. By multiplying these two metrics, TF-IDF identifies terms that are particularly "important" within individual documents while diminishing the weight of common terms that appear frequently across multiple documents.

The data management platform 104 can further perform category reduction (e.g., using text similarity algorithms) to ensure that the categories are not overly granular. In some implementations, the categorization engine 210 can create hierarchical categories, where a particular document is assigned to multiple categories. This hierarchical categorization allows for more nuanced organization and retrieval of documents based on multiple facets of their content. Methods of categorizing input documents 202 are discussed in further detail with reference to FIG. 4.

The duplicate detection engine 214 within the data management platform 104 identifies duplicates 216 within the unstructured data by generating intermediate and overall similarity values for pairs of summaries 208 and setting thresholds to detect duplicates. The duplicate detection engine 214 can compare the content of each summary to identify documents that contain similar or identical information. The duplicate detection engine 214 can, for example, determine vector similarities and apply predefined thresholds to determine if two summaries are duplicates. The data management platform 104 can embed document summaries into a vector database and use an embeddings model to detect similar documents by summary and full text through vector similarity search and text similarity algorithms. In some implementations, the results of the duplicate detection process can be classified into three actions: reject (true duplicate), accept (false duplicate), or review. In some implementations, the duplicate detection engine 214 can identify duplicates in different languages or a mix of languages by, for example, converting all documents to a common language. Methods of detecting duplicates are discussed in further detail with reference to FIG. 4.

The knowledge conflict check engine 218 within the data management platform 104 detects knowledge conflicts 220 between pairs of summaries 208. For example, the engine maps summaries 208 to topics and information sets and compares vector representations of information sets that share a common topic to identify contradictions. For example, one document that suggests a different action than another creates a knowledge conflict. The knowledge conflict check engine 218 can use one or more AI models to extract the semantic context to detect inconsistencies. Additionally, once knowledge conflicts 220 are identified, the knowledge conflict check engine 218 can resolve it by flagging the knowledge conflicts 220 for human review (human in the loop), suggesting potential resolutions based on predefined rules, or automatically resolving the conflict if the predefined rules or AI confidence thresholds are met. The knowledge conflict check engine 218 can, for example, update the conflicting summaries, reorganize the affected document categories, and/or provide additional context to resolve the contradiction. The knowledge conflict check engine 218 can identify and resolve the knowledge conflicts 220 using methods discussed with further reference to FIG. 4. In some implementations, the knowledge conflict check engine 218 can automatically resolve conflicts by automatically executing one or more computer-executable instructions on one or more applications associated with the input documents 202 based on subsequently received user input (e.g., clicking an "approve" button, turning on a setting to enable the data management platform 104 to automatically correct the input documents 202, and so forth).

Thresholds used in the environment 200 can be dynamically determined using, for example, a separate AI model that identifies a degree of satisfaction of the threshold against a set of criteria or performance metrics. For example, if the threshold uses computing resources above a certain threshold, the model can automatically increase/decrease the threshold to reduce the amount of computing resources used. In some implementations, the thresholds are determined using a panel of AI models (e.g., LLMs) by, for example, taking a majority vote of the models.

The linkage detection engine 222 within the data management platform 104 indicates the evolution and/or lineage of documents defined by the linked documents 224. The linkage detection engine 222 can use document parser libraries to search for embedded links within the documents. The linkage detection engine 222 can track changes and updates across different versions of documents to provide a history of modifications, parent-child relationships, and so forth. In some implementations, the engine can generate visual representations of document linkages in the form of, for example, a knowledge graph, a tree structure, a table, or another data structure. In some implementations, the linkage detection engine 222 can dynamically update the visual representations as new versions of documents are created or existing documents are modified. Thus, users are enabled access to the most current depiction of document relationships. The linkage detection engine 222 can associate and display metadata for each linkage, including timestamps of changes, the author of modifications, the nature of the changes made, and so forth.

The organizational reference engine 226 within the data management platform 104 outputs organizational references 228 by mapping documents back into an organizational system of an organization. The organizational reference engine 226 can parse data within the organizational system to identify corresponding reference numbers or other metadata associated with the documents. In some implementations, the organizational reference engine 226 uses a customized small language model (SML) to use domain-specific data (e.g., organizational-specific data) to search for the organizational references 228. In some implementations, the organizational reference engine 226 can integrate with external systems to fetch additional metadata (e.g., references from regulatory authorities).

The results 230 can indicate the outputs of the data management platform 104 in the form of a report, a graphical representation, an image, a video, an audio file, and so forth. The data management platform 104 can compile the input documents 202, the summaries 208, the categories 212, the duplicates 216, the knowledge conflicts 220, the linked documents 224, and/or the organizational references 228 into a dataset that can be, in some implementations, exported to downstream systems through application programming interfaces.

The user interface 232 can display or otherwise indicate the results 230 and enables users to interact with the data management platform 104. The user interface 232 can provide different views and filters to aid users in navigating the data. Users can view summaries, categories, duplicates, knowledge conflicts, document linkages, and/or organizational references through the user interface 232. In some implementations, the user interface 232 can enable the input of the user feedback 234. The data management platform 104 can use the user feedback 234 to improve the accuracy and relevance of the summaries, categories, duplicates, knowledge conflicts, document linkages, and/or organizational references using methods discussed with further reference to FIG. 4. In some implementations, the user feedback 234 can be used to train the AI models within the platform. For example, if the user continuously re-uploads the same unstructured data, the data management platform 104 can modify one or more elements of environment 200 based on evaluating the user feedback 234 using, for example, the root cause evaluation engine 112 in FIG. 1.

Figure 3A:
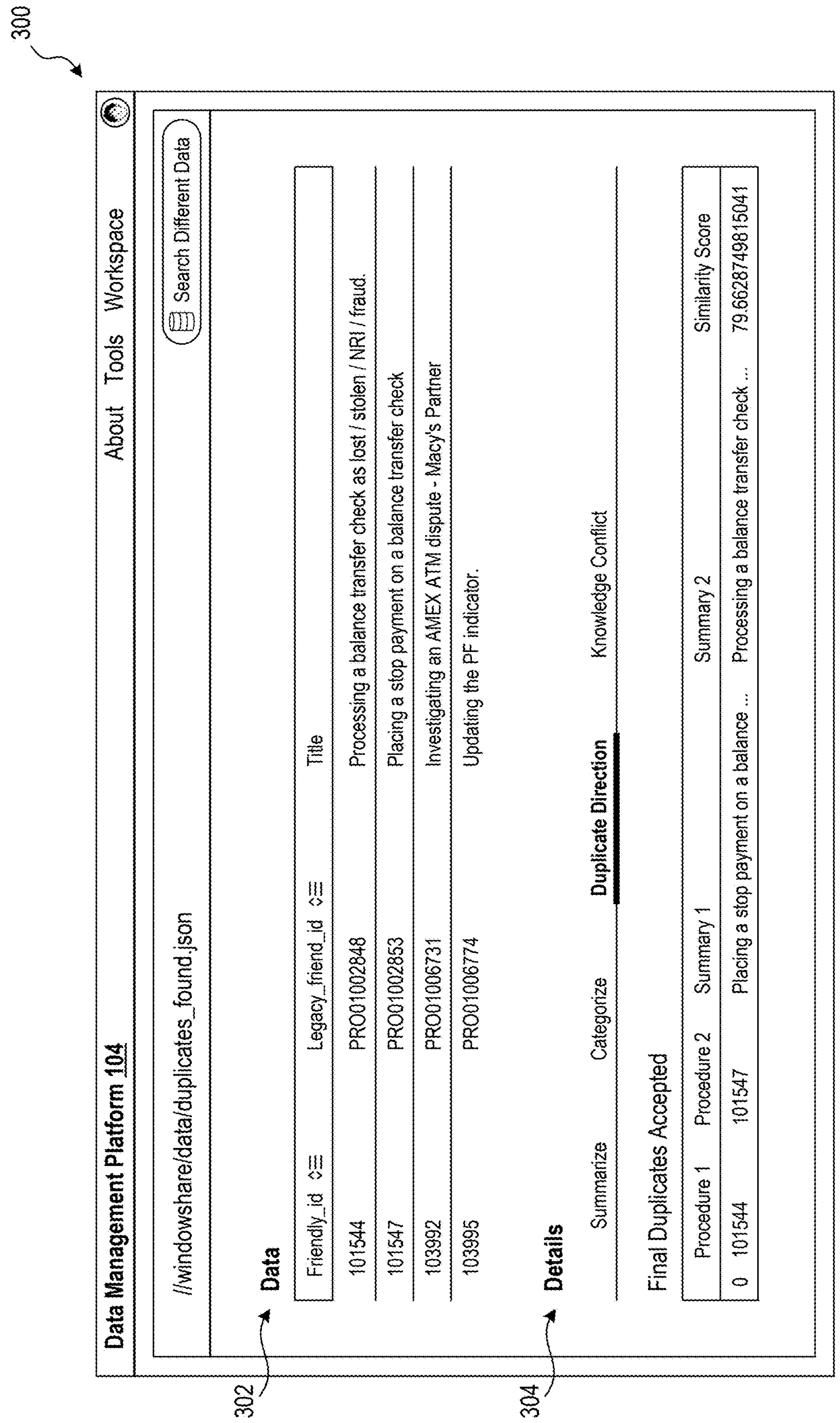
FIG. 3A illustrates a screenshot of a user interface of the data management platform displaying detected duplicates of the unstructured data.

FIG. 3A illustrates a screenshot of a user interface 300 of the data management platform 104 displaying detected duplicates 304 of the unstructured data. The user interface 300 includes data 302 (e.g., input documents 202). The user interface 300 of the data management platform 104 can include a navigation menu providing options, such as "About," "Tools," and "Workspace," to enable users to access various functionalities and additional information of the data management platform 104. The user interface 300 can include one or more indicators of an originating location of the data 302 (e.g., a file path input field that displays the path to the current dataset illustrated as "//windowshare/data/duplicates_found.json" in FIG. 3A).

The data 302 can include a visual representation of the input documents 202 in FIG. 2. The user interface 300 can present the data as, for example, a table organized into columns for different variables (e.g., "Friendly_id," "Legacy_friend_id," "Title" in FIG. 3A). The user interface 300 can include listed entries (e.g., within the table) that indicate the values of the variables. Duplicates 304 in the user interface 300 of the data management platform 104 refer to a section that identifies duplicate entries (e.g., detected by the duplicate detection engine 214 in FIG. 2) within the dataset. The user interface 300 can indicate a similarity score of the duplicates 304, which can quantitatively express the degree of similarity to identify procedural overlaps or redundancies. For example, FIG. 3A illustrates a similarity score of 79.6628749815041 between two procedures both associated with balance transfer checks. In some implementations, the user interface 300 indicates the degree of similarity using a binary indicator, a categorical indicator, multiple indicators, a hierarchical indicator, and so forth.

Figure 3B:
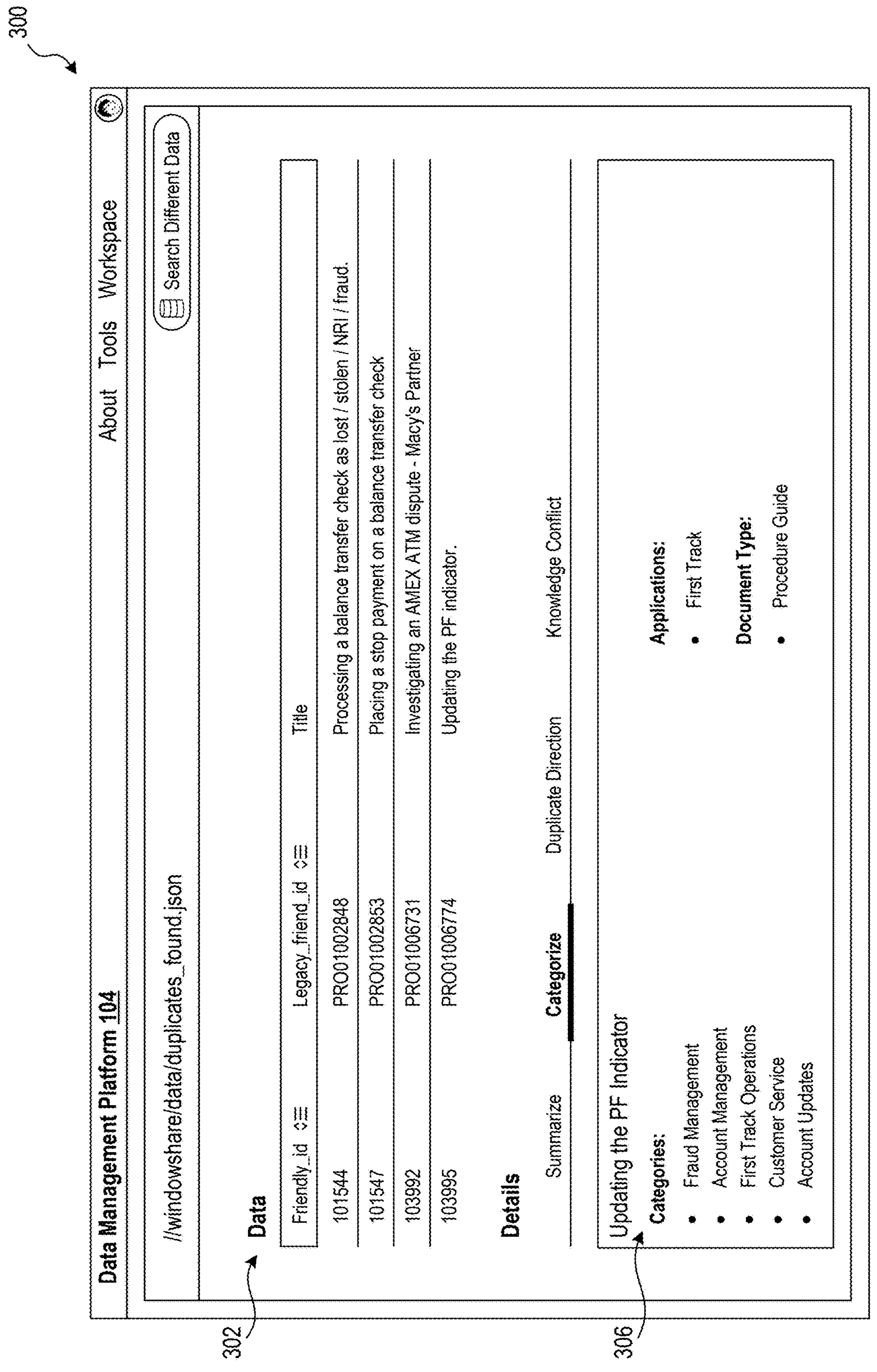
FIG. 3B illustrates a screenshot of the user interface of the data management platform displaying identified categories of the unstructured data.

FIG. 3B illustrates a screenshot of the user interface 300 of the data management platform 104 displaying identified categories 306 of the unstructured data. Categories 306 in the user interface 300 of the data management platform 104 represent the classified groups that organize and manage the unstructured data (e.g., generated by the categorization engine 210 of FIG. 2). For example, categories 306 in FIG. 3B include different operational areas such as Fraud Management, Account Management, First Track Operations, Customer Service, Account Updates, and so forth. Each category can be mapped to procedures and documents sharing common activities.

FIG. 4 is a flow diagram illustrating an example process 400 of remediating anomalies using the data management platform 104 of FIG. 1. In some implementations, the process 400 is performed by components of example devices 1800 illustrated and described in more detail with reference to FIG. 18. Particular entities, for example, the AI model(s), are illustrated and described in more detail with reference to AI system 1700 in FIG. 17. Implementations of process 400 can include different and/or additional operations or can perform the operations in different orders.

In operation 402, the data management platform 104 can obtain (e.g., receive via a user input to a user interface) a plurality of unstructured data (e.g., documents, images, video, audio, emails, chat logs, and so forth). For example, a user interface can enable users to upload various types of unstructured data. The unstructured data can be obtained using features such as drag-and-drop interfaces, file selection dialogs, and/or direct integrations with cloud storage services. One or more unstructured data of the plurality of unstructured data can include a content set. Each uploaded file can be parsed to extract the actual (e.g., existing) content within the document, which can be in various formats.

In operation 404, the data management platform 104 can generate, using a first AI model set, multiple summaries defining the plurality of unstructured data. For example, the data management platform 104 can categorize each unstructured document of the plurality of unstructured data into one or more clusters by comparing respective vector representations of content sets of pairs of unstructured data within the plurality of unstructured data. Each unstructured document can be converted into a vector representation that captures its semantic content. Techniques like Word2Vec, GloVe, or transformer-based models such as BERT can be used to produce these vector representations. A first distance set between vector representations corresponding to pairs of unstructured data categorized into a common cluster can be less than a second distance between vector representations corresponding to pairs of unstructured data categorized into different clusters (i.e., similar documents are grouped together).

For each particular cluster, the data management platform 104 can summarize the content set corresponding to respective unstructured data of the particular cluster. For example, within each cluster, the data management platform 104 generates summaries by identifying and selecting the most representative sentences or documents that capture the main ideas of that cluster's content. This selection is made by ranking sentences, portions of sentences, or documents based on their importance, such as the frequency of particular terms, the presence of phrases where the vector representation of the phrases is the closest in distance to the vector representation of the topic, and so forth. For example, the data management platform 104 can select and extract sentences directly from the original data or generate new sentences that encapsulate the highest-ranked terms of the original data.

In some implementations, the data management platform 104 detects knowledge conflicts. For example, the second AI model set can identify at least one content conflict between the one or more pairs of summaries within the multiple summaries by mapping a first summary of the multiple summaries to (1) a topic and (2) a first information set and mapping a second summary of the multiple summaries to (1) the topic and (2) a second information set. The data management platform 104 can determine an associated topic by using one or more NLP techniques to identify themes within the summary. The data management platform 104 can use, for example, the frequency and distribution of terms to detect particular keywords and phrases to highlight terms that characterize the document's content. The identified keywords and phrases are mapped to predefined or dynamically generated topics. The data management platform 104 can, for example, compare the terms in the summary to a database of topic models (which can be curated using domain-specific data). The data management platform 104 can assign the summary to the most relevant topic based on the highest similarity scores with these models.

The data management platform 104 can extract the information set by defining the entities and their relationships within the summary. The data management platform 104 can identify and categorize entities such as names, dates, organizations, and other elements within the summary. The extracted information sets and topics can be transformed into vector representations to numerically encode the semantic content of the summary. If the first and second information sets are different (e.g., by comparing vector representations corresponding to the first and second summaries and determining that a degree of similarity between the vector representations fails a predefined threshold), the data management platform 104 can identify the content as a knowledge conflict. For example, the data management platform 104 compares these vector representations of summaries that share the same topic. The cosine similarity measure can be used to quantify how similar or different these vectors are. If the similarity between the vectors falls below a predefined threshold (i.e., the information sets are determined to be dissimilar despite sharing a similar topic), the data management platform 104 flags the information sets as a knowledge conflict.

In some implementations, the data management platform 104 categorizes the unstructured data by generating an intermediate category set. For example, the data management platform 104 can categorize each summary in the set of summaries into one or more categories using a respective content set of the summary. To refine the intermediate categories further, the data management platform 104 can generate vector representations of each category. The data management platform 104 can calculate a degree of similarity between the vector representations of different categories and thus generate an overall category set by combining one or more categories in the intermediate category set using the degree of similarity between vector representations of the one or more categories. Categories with high similarity scores can be grouped together since this indicates a semantic similarity between the categories.

In operation 406, the data management platform 104 can identify, using a second AI model set (same as or different from the first set of AI models), at least one duplicate content set between one or more pairs of summaries within the multiple summaries. For example, the data management platform 104 can detect similar documents (or other modalities of data) using the summaries (e.g., vector similarity search). The data management platform 104 can perform a vector similarity search to detect similar documents by comparing vector representations of the one or more pairs of summaries by measuring the distance between their corresponding vector representations. Distance metrics such as cosine similarity, Euclidean distance, and the like can be used to quantify these distances. If the intermediate similarity value for a pair of summaries satisfies (e.g., meets or exceeds) a first predefined threshold, the data management platform 104 can detect similar documents using the full text (e.g., text similarity algorithms). For example, the data management platform 104 generates an overall similarity value by comparing the content sets corresponding to the pairs of summaries. The data management platform 104 can compare the full text of the documents corresponding to the pairs of summaries. Techniques such as TF-IDF or other NLP methods can be used to compare the content sets of the documents and generate the overall similarity value based on this detailed full-text comparison. Duplicative content can be identified by determining that the overall similarity value of the one or more pairs of summaries satisfies a second predefined threshold. If the overall similarity value meets or exceeds this threshold, the documents are flagged as duplicates.

In some implementations, the data management platform 104 generates, using a third AI model set (same as or different from the first and second sets of AI models), a reconfiguration command set configured to remove the at least one duplicate content set and/or content sets associated with knowledge conflicts from the content sets within the plurality of unstructured documents. For example, the data management platform 104 can identify one or more unstructured documents within the unstructured document set that corresponds to the at least one duplicate content and/or knowledge conflict and select a portion of the one or more unstructured documents by mapping the one or more unstructured documents to a predefined ranked rule set. The predefined ranked rule set can rank the one or more unstructured documents using a timestamp of a corresponding document, an author of a corresponding document, a version of a corresponding document, a status of a corresponding document, and so forth. For example, the data management platform 104 can select the most recent version of a document (determined by the timestamp), select documents authored by recognized experts, or select documents marked as the latest version.

In some implementations, the AI model assigns a priority score to each document. Subsequently, the data management platform 104 can generate a command set that defines the actions used to remove the duplicate content. The actions can include deleting the duplicate sections, merging information from multiple versions, or consolidating data into a single authoritative document. The data management platform 104 can, in some implementations, automatically execute the reconfiguration command set on the plurality of unstructured documents to modify the portion of the one or more unstructured documents to remove the at least one duplicate content from the content sets within the plurality of unstructured documents.

The reconfiguration commands can include computer-executable instructions to perform an automatic execution of one or more workflows for a first type of duplicate content and/or trigger a notification of one or more alerts for a second type of duplicate content. For instance, the data management platform 104 can identify the specific sections of documents that contain duplicate content, and the reconfiguration commands can instruct the data management platform 104 to either merge or delete these sections based on predefined rules. Additionally, the data management platform 104 can trigger alerts for duplicates that require user review. The modified data can be automatically displayed on a user interface.

In some implementations, the data management platform 104 generates and displays, on the user interface, a compliance report indicating (i) the identified at least one duplicate content and (ii) the reconfiguration command set. The compliance report can be generated automatically after the execution of the reconfiguration commands and provides a summary of the actions taken. The report can include, for example, information such as the document IDs, the sections affected, the nature of the duplicate content, the specific modifications made, and so forth.

Improving Data Quality Using the Data Management Platform

Figure 5:
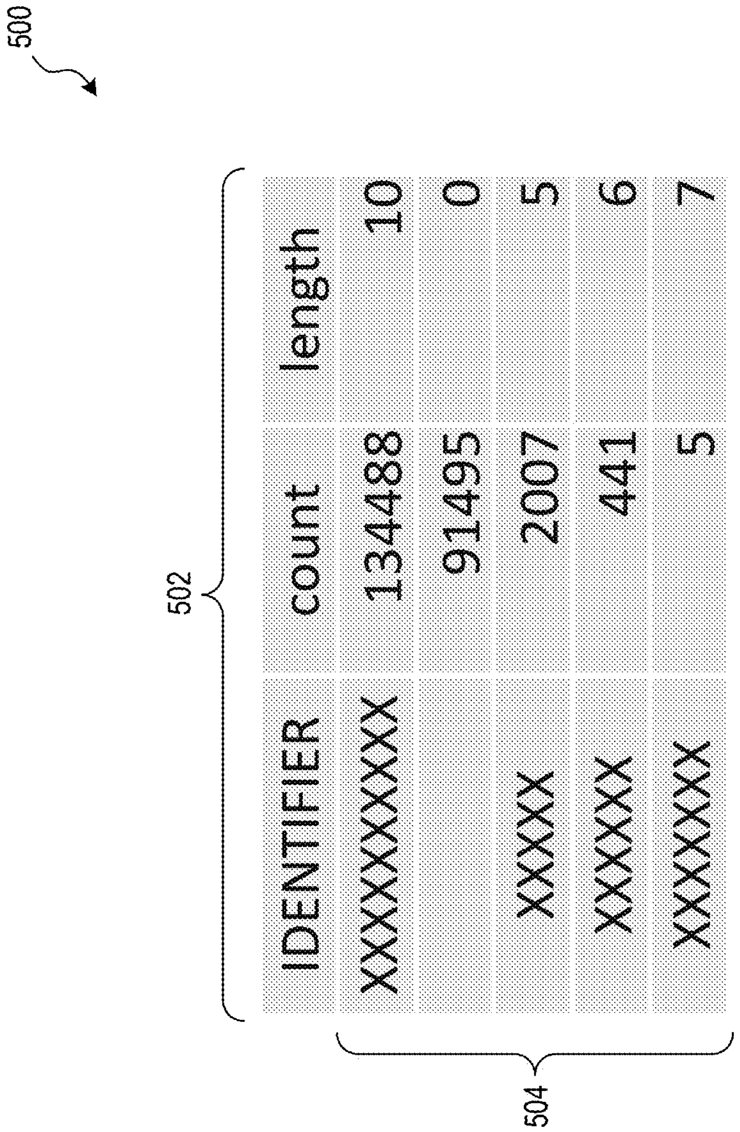
FIG. 5 illustrates an example environment of a data profiling engine of the data management platform of FIG. 1 for automatically detecting features of the dataset.

FIG. 5 illustrates an example environment 500 of the data profiling engine 106 of the data management platform 104 of FIG. 1 for automatically detecting features of an ingested dataset. Environment 500 includes variables 502 and observations 504. Implementations of example environment 500 can include different and/or additional components or can be connected in different ways.

The data profiling engine 106 can identify variables 502, which represent the different attributes or fields within the dataset (e.g., dataset 102 in FIG. 1). For example, in FIG. 5, the attributes can include “Identifier,” “count,” and “length.” The variables 502 can include numerical data, categorical data, dates, and other types of data points that define the structure of the dataset. For example, in a customer database, variables 502 can include customer ID, name, birth date, transaction amount, and product category. In some implementations, variables 502 can include derived attributes, such as calculated fields or aggregated metrics.

Further, the data profiling engine 106 can identify observations 504, which refer to the individual records or entries within the dataset that contain values for each of the variables 502. Each observation 504 represents a single instance of data, such as a row in a database table. Observations 504 can be a single value or multiple values. For example, in a sales dataset, an observation 504 can represent a single transaction, including details such as the transaction ID, date, customer ID, and amount. In some implementations, observations 504 can include time-series data, where each observation represents a data point in a sequence over time.

Figure 6:
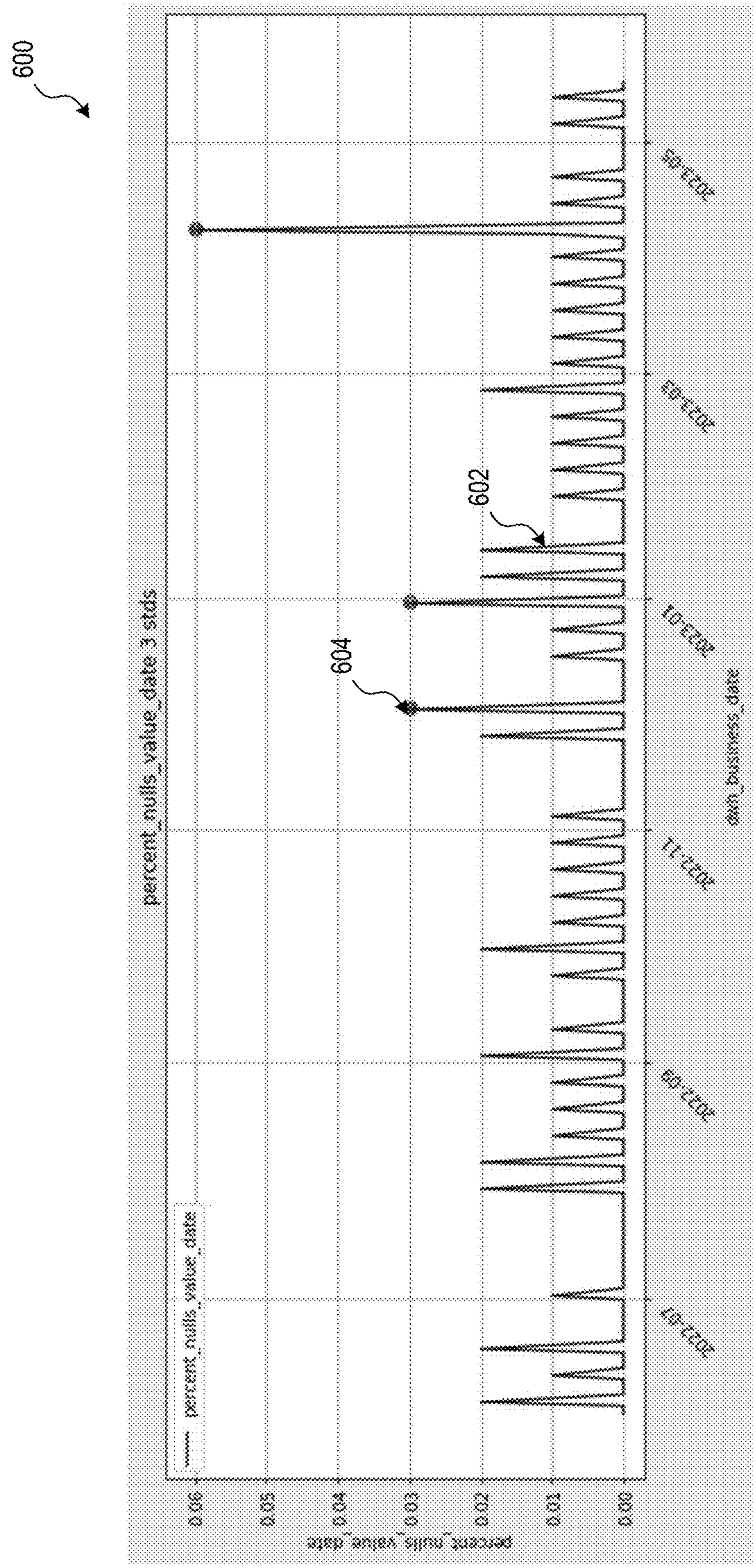
FIG. 6 illustrates an example environment of a threshold modeling engine of the data management platform of FIG. 1 for dynamically detecting univariate anomalies of the dataset.

FIG. 6 illustrates an example chart 600 of a threshold modeling engine 108 of the data management platform 104 of FIG. 1 for dynamically detecting univariate anomalies of the dataset. Chart 600 includes observations 602 and anomalies 604. Implementations of example chart 600 can include different and/or additional components or can be connected in different ways.

The observations 602 can be the same as or similar to observations 504. The observations 602 can refer to the individual data points or records within the dataset that are analyzed to detect anomalies. Each observation contains values for one or more variables, representing a single instance of data. The anomalies 604 are a subset of the observations 602 that deviate significantly from the expected patterns or thresholds established by the threshold modeling engine 108. The deviations can indicate potential errors or other unusual activities. The threshold modeling engine 108 can operate within chart 600 to dynamically detect univariate anomalies by identifying the distribution and variability of observations 602. The threshold modeling engine 108 can establish dynamic thresholds that adapt to changes in the data over time. For instance, the threshold modeling engine 108 can adjust the threshold for acceptable observation values based on historical data, accounting for seasonal variations. In some implementations, the threshold modeling engine 108 can use autoregressive integrated moving average (ARIMA) models to forecast future values and detect anomalies based on predicted trends.

Figure 7:
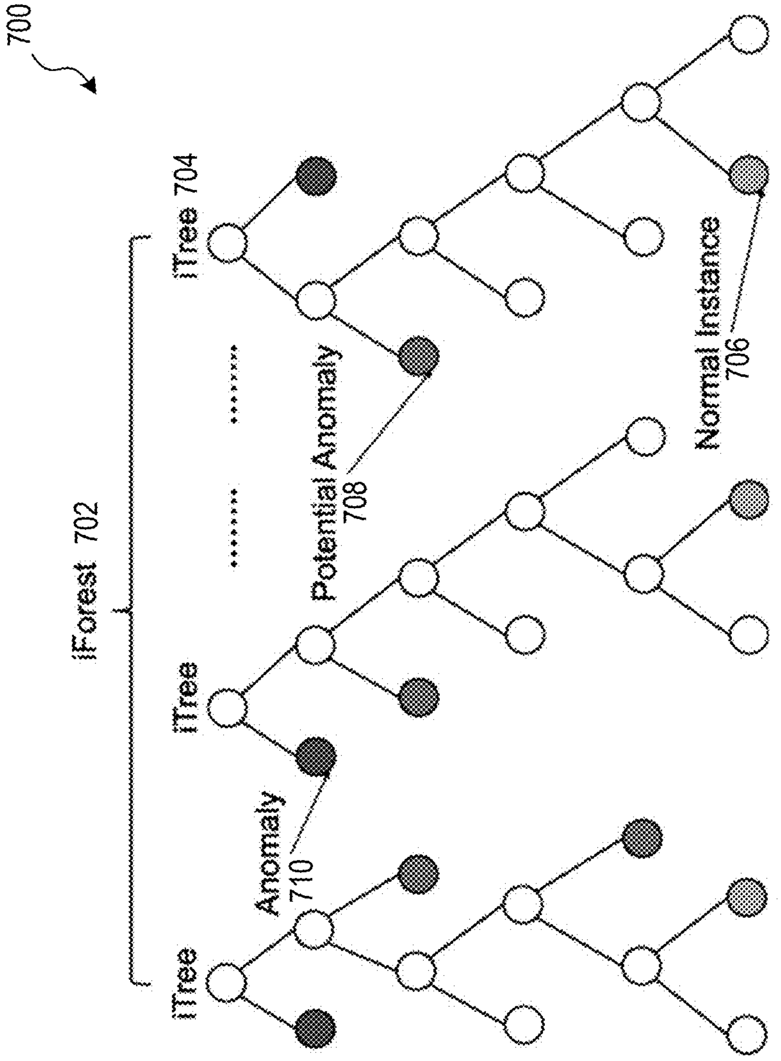
FIG. 7 illustrates an example environment of an anomaly detection engine of the data management platform of FIG. 1 for dynamically detecting multivariate anomalies of the dataset.

FIG. 7 illustrates an example environment 700 of an anomaly detection engine 110 of the data management platform 104 of FIG. 1 for dynamically detecting multivariate anomalies of the dataset. Environment 700 includes anomaly detection model 702, binary tree 704, non-flagged observation 706, flagged observation 708, and anomaly 710. Implementations of example environment 700 can include different and/or additional components or can be connected in different ways.

The anomaly detection model 702, such as an isolation forest, can be used to identify anomalies within a dataset by isolating observations that deviate significantly from the norm. The anomaly detection model 702 can, for example, construct multiple binary trees (isolation trees) to partition the data. Observations that require fewer splits to isolate can be considered anomalies. In some implementations, anomaly detection model 702 can use other techniques such as clustering-based methods (e.g., DBSCAN), statistical methods (e.g., Z-score), or neural networks (e.g., autoencoders) to detect anomalies. The binary tree 704 within the anomaly detection model 702 is a data structure that can be used by the anomaly detection model 702 to recursively partition the dataset into smaller subsets. Each node in the binary tree can represent a decision based on a feature value, and the branches can represent the possible outcomes of the decision. The partitioning continues until each observation is isolated in a leaf node. In some implementations, binary tree 704 can be replaced with other non-tree or tree-based structures, such as decision trees or random forests, which can also be used for anomaly detection by evaluating the depth of the nodes where observations are isolated.

The non-flagged observation 706 refers to data points within the dataset that are not identified as anomalies by the anomaly detection model 702. These observations fall within the expected range of values and patterns established by the model. The flagged observation 708 refers to data points that are identified as potential anomalies by the anomaly detection model 702. The flagged observation 708 exhibits unusual patterns or values that deviate from the norm and are flagged for further investigation. The degree of deviation can be customizable by a user. In some implementations, flagged observation 708 can be prioritized based on the severity of the deviation or other user-provided context (e.g., type of deviation, extent of deviation). The anomaly 710 can refer to a specific type of flagged observation 708 that has been confirmed as an anomaly. Anomalies 710 represent significant deviations (e.g., above a certain threshold) from the expected patterns and can indicate errors or other unusual activities.

Figure 8:
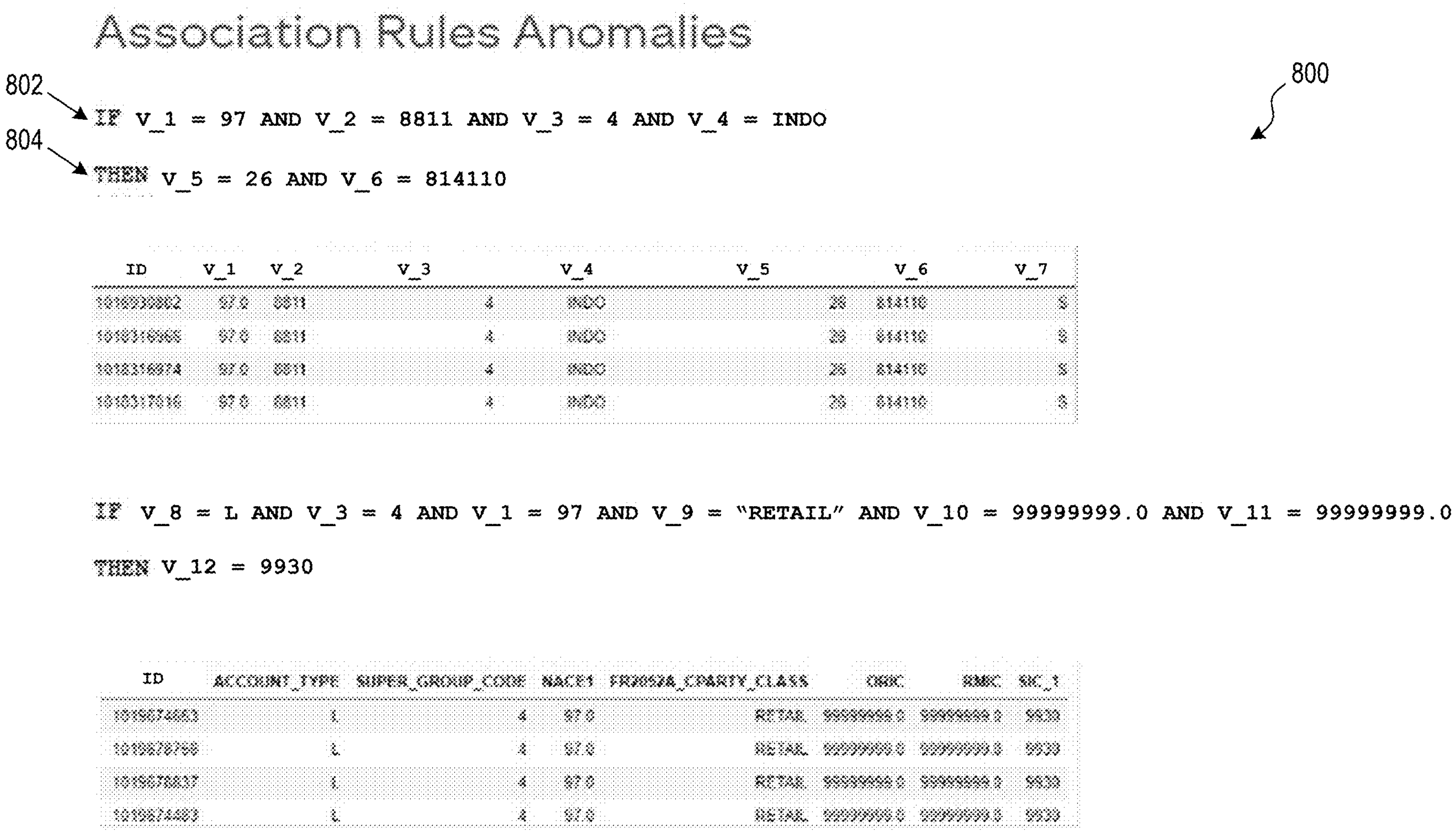
FIG. 8 illustrates an example environment of a root cause evaluation engine of the data management platform of FIG. 1 for identifying root causes of the anomalies of the dataset.

FIG. 8 illustrates an example environment 800 of a root cause evaluation engine 112 of the data management platform 104 of FIG. 1 for identifying root causes of the anomalies of the dataset. Environment 800 includes antecedent 802 and consequent 804. Implementations of example environment 800 can include different and/or additional components or can be connected in different ways.

The antecedent 802 refers to the condition or set of conditions that precede and potentially cause an observed anomaly in the dataset. For an association rule, the antecedent is the "if" portion of the rule, representing the combination of factors that lead to a particular outcome. On the other hand, the consequent 804 is the outcome or result that follows from the antecedent 802 in an association rule. The consequent 804 represents the "then" portion of the rule, indicating the effect or anomaly that occurs when the antecedent conditions are met. The root cause evaluation engine 112 operates within environment 800 to identify the antecedent 802 and consequent 804 relationships that explain the root causes of anomalies in the dataset. The root cause evaluation engine 112 can use association rule mining to discover patterns and correlations between different variables. Further methods of determining the root cause are discussed with reference to FIG. 10.

Figure 9:
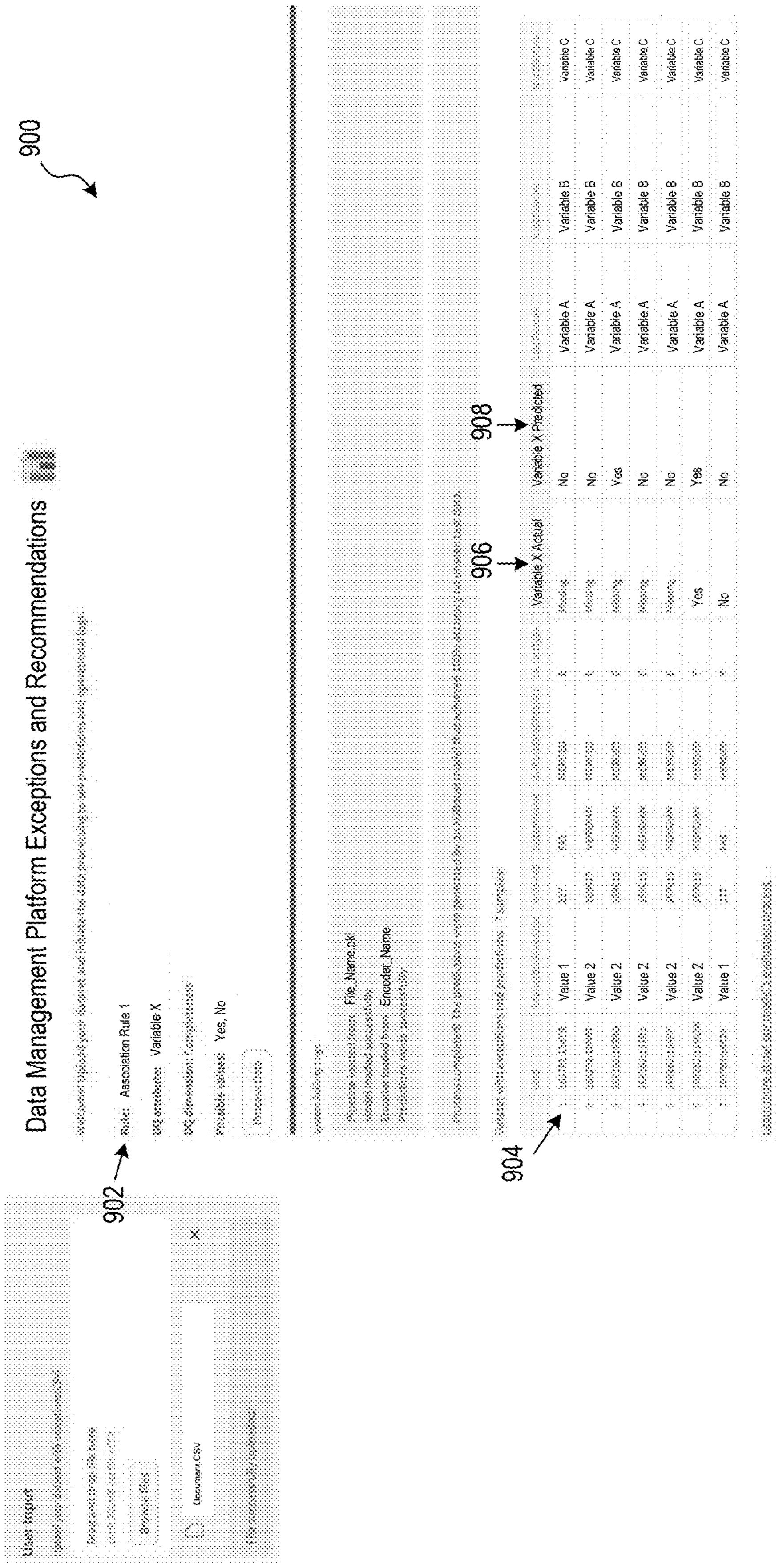
FIG. 9 illustrates an example environment of a remediation engine of the data management platform of FIG. 1 for remediating the anomalies of the dataset.

FIG. 9 illustrates an example environment 900 of a remediation engine 116 of the data management platform 104 of FIG. 1 for remediating the anomalies of the dataset. Environment 900 includes association rule 902, observation 904, observed variable values 906, and recommended variable values 908. Implementations of example environment 900 can include different and/or additional components or can be connected in different ways.

The association rule 902 refers to a rule derived from data mining techniques that identifies relationships between variables in the dataset. The association rule 902 can include an antecedent (if portion) and a consequent (then portion), indicating that when certain conditions are met, a specific outcome is likely to occur. The observation 904 can be the same as or similar to observations 504 and/or observation 602. The observed variable values 906 refer to the values of the variables in an observation 904. The values are used to evaluate the observation against the association rules 902 to determine if any anomalies are present (e.g., missing values). The recommended variable values 908 are the suggested values for the variables in an observation 904 that would align the observation with the expected patterns or rules. The recommendations can be generated by the remediation engine 116 based on the association rules 902 and the identified anomalies. The remediation engine 116 compares the association rules 902 against expected association rules and generates recommended variable values 908 to address identified anomalies. For example, if a particular association rule indicates a particular bias not within the operative boundaries of the dataset's use case (e.g., a social bias in a financial risk assessment use case), the remediation engine 116 can identify the particular association rule as an anomaly.

FIG. 10 is a flow diagram illustrating an example process 1000 of remediating anomalies using the data management platform 104 of FIG. 1. In some implementations, the process 1000 is performed by components of example devices 1800 illustrated and described in more detail with reference to FIG. 18. Particular entities, for example, the AI model(s), are illustrated and described in more detail with reference to AI system 1700 in FIG. 17. Implementations of process 1000 can include different and/or additional operations or can perform the operations in different orders.

In operation 1002, the data management platform 104 can receive a dataset (structured or non-structured) including an observed set of values for one or more variables in a set of variables. In some implementations, the data management platform 104 can receive the dataset through various data ingestion methods, such as integrating with one or more application programming interface(s) (API(s)). The dataset can be sourced from multiple origins, including databases, data lakes, cloud storage, or external APIs. For structured data, the dataset can be in formats such as CSV, JSON, XML, or SQL tables, while unstructured data can include text files, images, audio recordings, or video files.

In operation 1004, the data management platform 104 can identify, using a first set of AI models, a set of anomalies in the observed set of values of one or more variables in the structured dataset. The data management platform 104 can determine multiple reference patterns that correspond to an expected set of values for the set of variables and/or compare an observed set of patterns in the observed set of values against the multiple reference patterns.

In some implementations, the models can include supervised learning models, such as decision trees, support vector machines, and neural networks, which are trained on labeled datasets to recognize normal and anomalous patterns. The models can additionally or alternatively include unsupervised learning models, such as clustering algorithms (e.g., K-means, DBSCAN) to group similar observations together based on their features and anomaly detection models (e.g., isolation forests, one-class SVMs), which do not require labeled data and can detect anomalies based on deviations from the learned patterns of the dataset. For example, an isolation forest model (e.g., anomaly detection model 702 in FIG. 7) can construct multiple binary trees to partition the data and isolate observations that deviate beyond a certain threshold from the norm. Observations that require fewer splits to isolate can be considered anomalies. In some implementations, the platform can use ensemble methods, combining the outputs of multiple models. For example, the platform can use a combination of statistical tests, machine learning models, and clustering algorithms and aggregate the results of the multiple models by using a weighted score or using a majority vote.

The data management platform 104 can determine multiple reference patterns that correspond to an expected set of values for the set of variables. The reference patterns can be derived from historical data, statistical analysis, and/or domain-specific knowledge. For example, the data management platform 104 can use time-series analysis to identify seasonal trends and patterns in the data, or the data management platform 104 can calculate expected ranges and distributions for the variables (e.g., using chi-square goodness of fit tests). In some implementations, the platform can use dynamic threshold models to adaptively set thresholds based on historical behavior. For example, the data management platform 104 can evaluate past data to determine the typical range of values for a variable during different times of the year and set dynamic thresholds that account for seasonal variations. Thus, the data management platform 104 can detect anomalies that deviate from the expected reference patterns while accounting for natural fluctuations in the data.

The data management platform 104 can compare the observed set of patterns in the observed set of values against the multiple reference patterns to identify anomalies. For example, the data management platform 104 can calculate the Z-score (e.g., how many standard deviations an element is from the mean of the dataset) for each observed value to determine whether the value significantly deviates from the mean. Values with a Z-score above a certain threshold (e.g., ±3) can be considered anomalies, indicating that they are rare and unusual compared to the rest of the data. In another example, the data management platform 104 can calculate the Mahalanobis distance, which measures the distance between a point and a distribution, to identify multivariate anomalies (i.e., data points that are beyond a certain threshold from the center of the distribution).

In operation 1006, using a second set of AI models, the data management platform 104 can evaluate the identified set of anomalies by dynamically generating an observed set of association rules configured to cause the second set of AI models to generate the observed set of values in the structured dataset and/or compare the observed set of association rules with an expected set of association rules to determine one or more observed association rules corresponding to the set of anomalies. The generated association rules can describe the relationships between different variables in the dataset. For example, an association rule can state that if variable A has a certain value, then variable B is likely to have a specific value. The data management platform 104 can identify frequent itemsets, which are combinations of variable values that occur frequently within the dataset, by counting the occurrences of different itemsets and determining which itemsets meet a predefined support threshold, indicating that they are frequent.

From these frequent itemsets, the data management platform 104 can generate association rules that describe the relationships between different variables. Each rule can have the form "If antecedent, then consequent," where the antecedent and consequent are subsets of the itemset. The data management platform 104 can calculate metrics such as confidence, which measures the proportion of records containing the antecedent that also contain the consequent, and/or lift, which quantifies how much more likely the consequent (the outcome) is to occur when the antecedent (the condition) is present compared to when the antecedent is not present (i.e., the degree to which the occurrence of the antecedent increases the likelihood of the consequent occurring).

The expected set of association rules can be derived from historical data, domain knowledge, or predefined guidelines. By comparing the observed rules with the expected rules, the platform can identify which rules deviate from the norm and are associated with the anomalies. For example, if an observed association rule is not found in the expected association rules, the observed association rule can be flagged as a potential anomaly. Additionally, or alternatively, if an observed association rule shows a significantly higher lift value than a corresponding expected association rule, it may indicate a stronger-than-expected association between the variables, potentially signaling an anomaly. Conversely, if an observed association rule has a much lower support or confidence value than the expected association rule, it may indicate that the expected pattern is not occurring as frequently as anticipated, which could also be a sign of an anomaly.

In operation 1008, using a third set of AI models, the data management platform 104 can generate a set of reconfiguration commands to remove the identified set of anomalies. For example, the data management platform 104 can identify a portion of the observed sets of values corresponding to the one or more observed association rules corresponding to the set of anomalies and map the portion of the observed sets of values to one or more expected association rules configured to adjust the portion of the observed set of values to a corresponding expected set of values. For example, if an observed association rule indicates that a certain combination of variable values is anomalous, the data management platform 104 can refer to the corresponding expected association rule to identify the expected values. The data management platform 104 can generate reconfiguration commands that specify the adjustments to transform the observed values to the expected values. In some implementations, the data management platform 104 can select the third set of AI models from multiple AI models using a respective set of performance metric values (e.g., accuracy, precision, recall, F1 score, mean squared error, and so forth) of each of the multiple AI models.

In operation 1010, the data management platform 104 can automatically execute the set of reconfiguration commands on the structured dataset to modify the one or more observed association rules corresponding to the set of anomalies to align with the one or more expected association rules. The data management platform 104 can use SQL queries to select the observations specified in the reconfiguration commands. The data management platform 104 can update the values of specific variables, recalculate derived fields, adjust the relationships between variables, and so forth. For example, if an observed association rule indicates that a certain combination of variable values is anomalous, the platform updates the values of the affected variables to match the expected combination specified by the corresponding expected association rule.

In some implementations, the data management platform 104 can receive an unstructured dataset from one or more of text documents, emails, chat logs, images, or voice recordings. Using a fourth set of AI models, the data management platform 104 can evaluate the unstructured dataset against a set of predefined criteria. For example, the data management platform 104 can extract a set of information from the unstructured dataset, which can include a set of entities. The data management platform 104 can evaluate the set of information against a set of threshold values of the set of predefined criteria by measuring, for example, a degree of completeness of the extracted information, a degree of accuracy of the extracted information, a degree of satisfaction of the extracted information with specific formats of the set of predefined criteria, and so forth.

Using the evaluation, the fourth set of AI models can identify a portion of the extracted information failing to satisfy the set of threshold values. The data management platform 104 can generate a set of actions (e.g., reconfiguration commands) to increase the degree of satisfaction of the extracted information against a set of predefined criteria. The reconfiguration commands can include, for example, instructions to automatically execute a set of workflows for a first type of anomaly, triggering one or more alerts for a second type of anomaly, and so forth.

The data management platform 104 can display an artifact such as a compliance report indicating one or more of (i) the identified set of anomalies, (ii) the set of actions, (iii) a degree of satisfaction of the unstructured dataset with the set of predefined criteria, and so forth. The reports can be presented in various formats, such as dashboards, charts, tables, chatbots, and so forth.

Example Out-Of-Distribution Prediction Engine of the Data Management Platform

Figure 11:
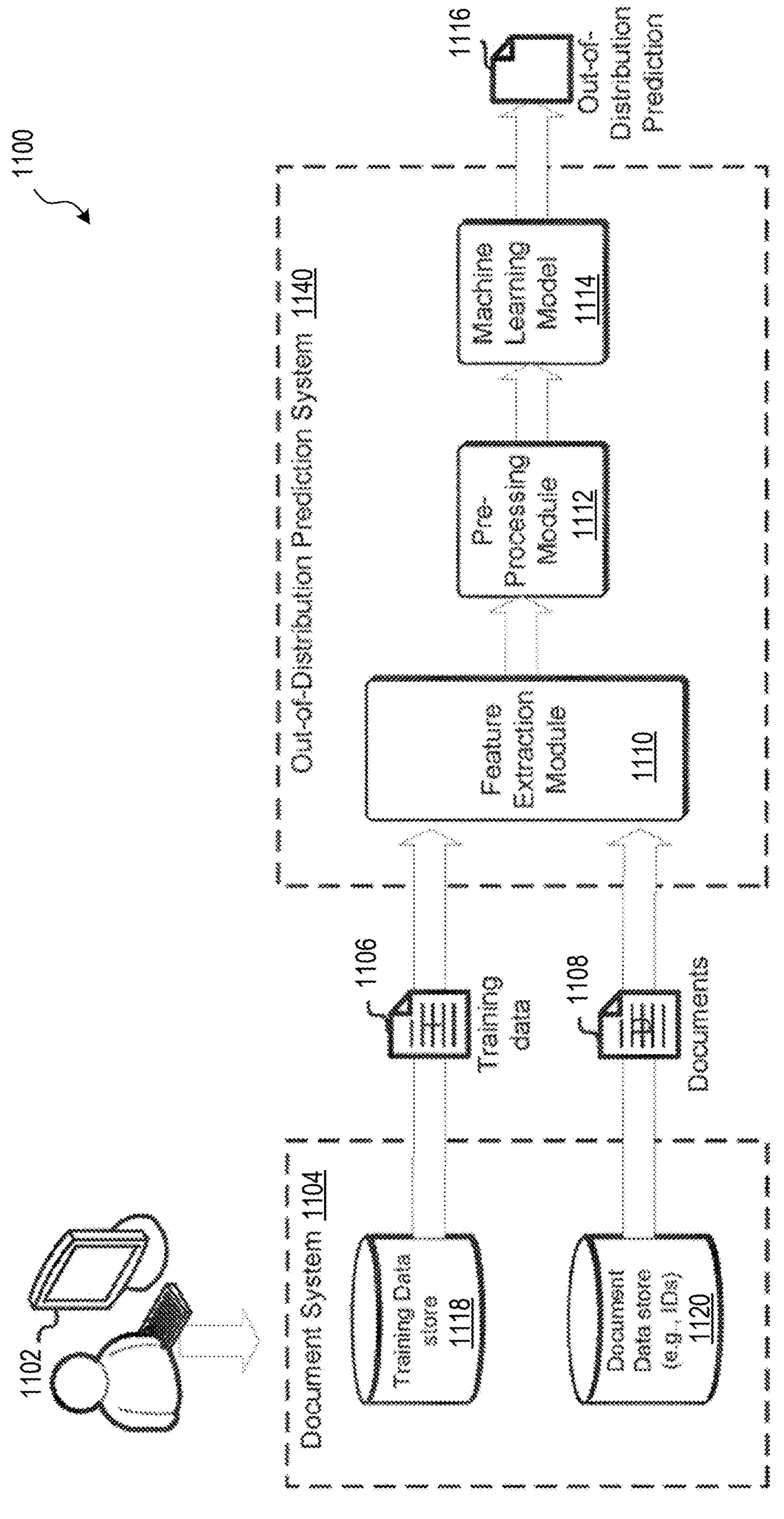
FIG. 11 illustrates an example of an overview of an out-of-distribution prediction engine.

FIG. 11 illustrates an aspect of an environment 1100 for an out-of-distribution prediction engine 1140 of the data management platform 104 (e.g., within the anomaly detection engine 110) in which an implementation may be practiced. In some implementations, users 1102 of this environment 1100 include but are not limited to client users of the out-of-distribution prediction engine 1140. In at least one implementation, as illustrated in FIG. 11, the environment 1100 includes an out-of-distribution prediction engine 1140, as described herein, that receives a training document of training data 1106 that may be used to train a machine learning model 1114. In at least one implementation, a feature extraction module 1110 identifies and extracts relevant features of the training data 1106 or input data, such as documents 1108, to be further processed (e.g., encoding, embedding, and/or masking) by a pre-processing module 1112 and then provided to the machine learning model 1114. In at least one implementation, the out-of-distribution prediction engine 1140 receives documents 1108 as input data to the machine learning model 1114 and generates, as an output of the machine learning model 1114, an out-of-distribution prediction 1116. The terms "documents" and "document" may be used interchangeably in the present disclosure, where the scope of the implementation can include "one or more documents."

In at least one implementation, the user 1102 of this environment 1100 includes but is not limited to client users of the out-of-distribution prediction engine 1140. In at least one implementation, the user 1102 may be an individual, a computing system, an executing software application, a computing service, a computing resource, or other entity capable of controlling input to and receiving output from the out-of-distribution prediction engine 1140. The user 1102 may have access to a set of user records and/or a profile with the out-of-distribution prediction engine 1140 and may have a set of credentials (e.g., username, password, etc.) registered with the out-of-distribution prediction engine 1140. In at least one implementation, user 1102 presents, or otherwise proves, the possession of security credentials, such as by inputting a password, access key, and/or digital signature, to gain access to out-of-distribution prediction. In at least one implementation, the user 1102 creates, using a user device or other computing device, an account with the out-of-distribution prediction engine 1140. In at least one implementation, user 1102 uploads documents 1108 to the out-of-distribution prediction engine 1140, causing the machine learning model 1114 to generate a prediction 1116 of whether the documents 1108 are in-distribution or out-of-distribution. For example, the machine learning model expects a specific type of data when it is being trained to perform operations. In at least one implementation, if a user 1102 uploads a document that is an "unexpected" document (e.g., a driver's license when the model is being trained to distinguish passports from national identity documents (IDs)), the machine learning model 1114 may generate an out-of-distribution prediction 1116 that the unexpected document is an outlier or an unknown document to in-distribution documents.

In at least one implementation, the document system 1104 includes a training data store 1118 and document data store 1120. In at least one implementation, the document system 1104 is a repository providing non-transitory and persistent (non-volatile) storage for data objects. Examples of data stores include file systems, relational databases, non-relational databases, object-oriented databases, comma-delimited files, and other files. In some implementations, the document system 1104 is a distributed data store. In at least one implementation, the training data store 1118 may store training data 1106 and information related to in-distribution data and out-of-distribution data. In at least one implementation, the document data store 1120 may store documents 1108 and information related to user documents (e.g., IDs, passports, or driver's licenses).

In at least one implementation, training data 1106 may be maintained in the training data store 1118 and located, processed, and provided for use in processing by the out-of-distribution prediction engine 1140 for training the machine learning model 1114. For example, training data 1106 may include, but is not limited to, document bundles, national identification, driver's license, or passports. In at least one implementation, each page of training data 1106 may be independently processed separately from other pages. In at least one implementation, each page of training data 1106 may be processed as a whole with all pages included.

In at least one implementation, documents 1108 may be maintained in the document data store 1120 and located, processed, and provided for use in processing by the out-of-distribution prediction engine 1140, as input, to the machine learning model 1114 to perform inferencing operations. For example, documents 1108 may include, but are not limited to, document bundles, national identification, driver's license, or passports. In at least one implementation, each page of a document, such as document 1108, may be independently processed separately from other pages. In at least one implementation, each document, such as document 1108, may be processed as a whole with all pages included.

In at least one implementation, a feature extraction module 1110 may include an encoder that encodes input data to a machine learning model 1114, such as training data 1106 or documents 1108, into one or more feature vectors. In at least one implementation, an encoder of the feature extraction module 1110 encodes training data 1106 and/or document 1108 into a sentence embedding vector. In at least one implementation, a processor uses this sentencing embedding vector to perform a nearest neighbor search to generate one or more neighbors. In at least one implementation, one or more neighbors is a value corresponding to a key comprising training data 1106 or documents 1108. In at least one implementation, one or more neighbors comprise plaintext data. In at least one implementation, an encoder of the feature extraction module 1110 encodes one or more neighbors into a text embedding vector. In at least one implementation, an encoder of the feature extraction module 1110 encodes one or more neighbors into a sentence embedding vector. In at least one implementation, machine learning model 1114 uses training data 1106 and/or documents 1108 to generate a prediction, such as out-of-distribution prediction 1116. In at least one implementation, a processor of a client device interfaces with an application of the out-of-distribution prediction engine 1140 using a machine learning (ML) model application programming interface(s) (API(s)). In at least one implementation, the processor accesses the machine learning model 1114 using the machine learning model application programming interface(s) (API(s)).

In at least one implementation, the pre-processing module 1112 may be a computing system, software, software program, hardware device, module, or component capable of performing the masking of training data 1106 and/or input data, such as documents 1108, to generate masked training data and/or masked input data, respectively. In at least one implementation, further in the implementation, the masked training data is provided to the machine learning model 1114 to perform training operations of the machine learning model 1114, and the masked input data is provided to the machine learning model 1114 to perform inferencing operations associated with classifications and predictions of whether documents 1108 are out-of-distribution prediction 1116.

In at least one implementation, parts, methods, and/or systems described in connection with FIG. 1 are as further illustrated nonexclusively in any of FIGS. 11-18.

Figure 12:
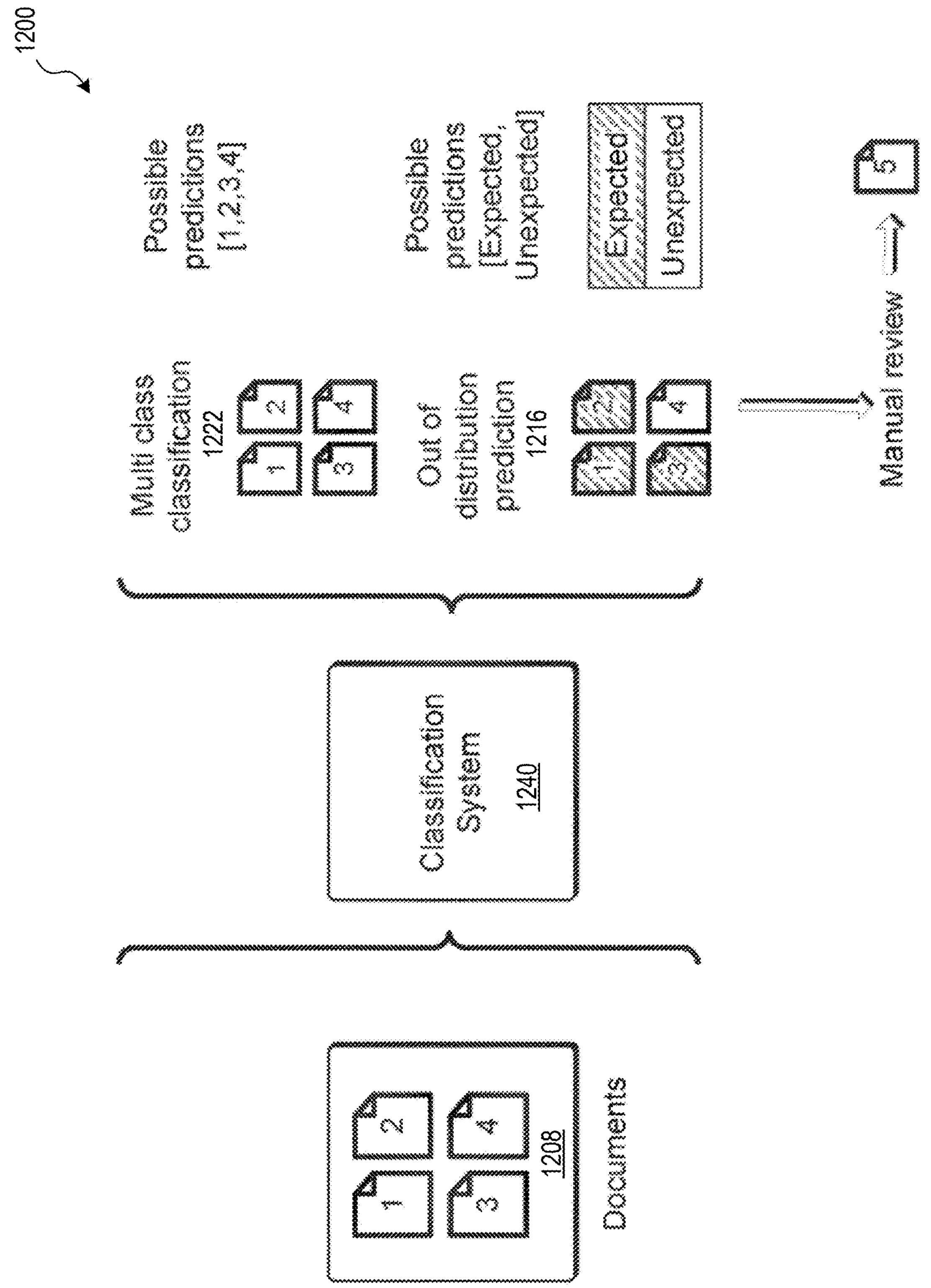
FIG. 12 illustrates an example of a classification system of an out-of-distribution prediction engine of the data management platform of FIG. 1.

FIG. 12 illustrates an example of a classification system, in accordance with an implementation. As illustrated in FIG. 12, the example 1200 includes a classification system 1240, such as the out-of-distribution prediction engine 1140, that receives documents 1208 (including documents #1-4) and makes a prediction, such as an out-of-distribution prediction 1216, with a machine learning model, such as machine learning model 1114 in FIG. 11. In at least one implementation, if the out-of-distribution prediction 1216 of a document is an unexpected prediction, for example, document #4 of the documents 1208 is unknown in the in-distribution documents, this document may be sent for manual review.

In at least one implementation, the classification system 1240 generates a classification of a document. For example, the classification system may be used to distinguish between national identifications (IDs) and a passport. In at least one implementation, if the classification system 1240 receives documents 1208, from a user of the system, such as user 1102 in FIG. 11, the classification system 1240 may classify the documents as a passport or an ID and obtain an associated confidence score with that decision. In at least one implementation, a processor of the classification system 1240 performs operations to compare the confidence score to a threshold value. In at least one implementation, the threshold value is determined by using training data, such as training data 1106 in FIG. 11.

In at least one implementation, the classification system 1240 generates a prediction of the classification of the documents 1208. In at least one implementation, the classification system 1240 is an automated classification library that enables multi-class classification 1222. In at least one implementation, the automated classification library is data agnostic. In at least one implementation, the classification system 1240 classifies documents 1208 by simultaneously performing image patch and text token masking during the training of a machine learning model, such as machine learning model 1114 in FIG. 11. In at least one implementation, as a result of simultaneous image patch and text token masking during training, the machine learning model may learn the majority of important features for each class. In at least one implementation, the prediction may be expected or unexpected. In at least one implementation, if the prediction is expected, the document is consistent with the in-domain data. In at least one implementation, if the prediction is unexpected, the document is consistent with the out-of-domain data and may be sent out for manual review. In at least one implementation, the classification system 1240 may cause a user of the system, such as user 1102 in FIG. 11, to perform a manual review of the unexpected document or outlier.

In at least one implementation, parts, methods, and/or systems described in connection with FIG. 12 are as further illustrated nonexclusively in any of FIGS. 11-18.

Figure 13:
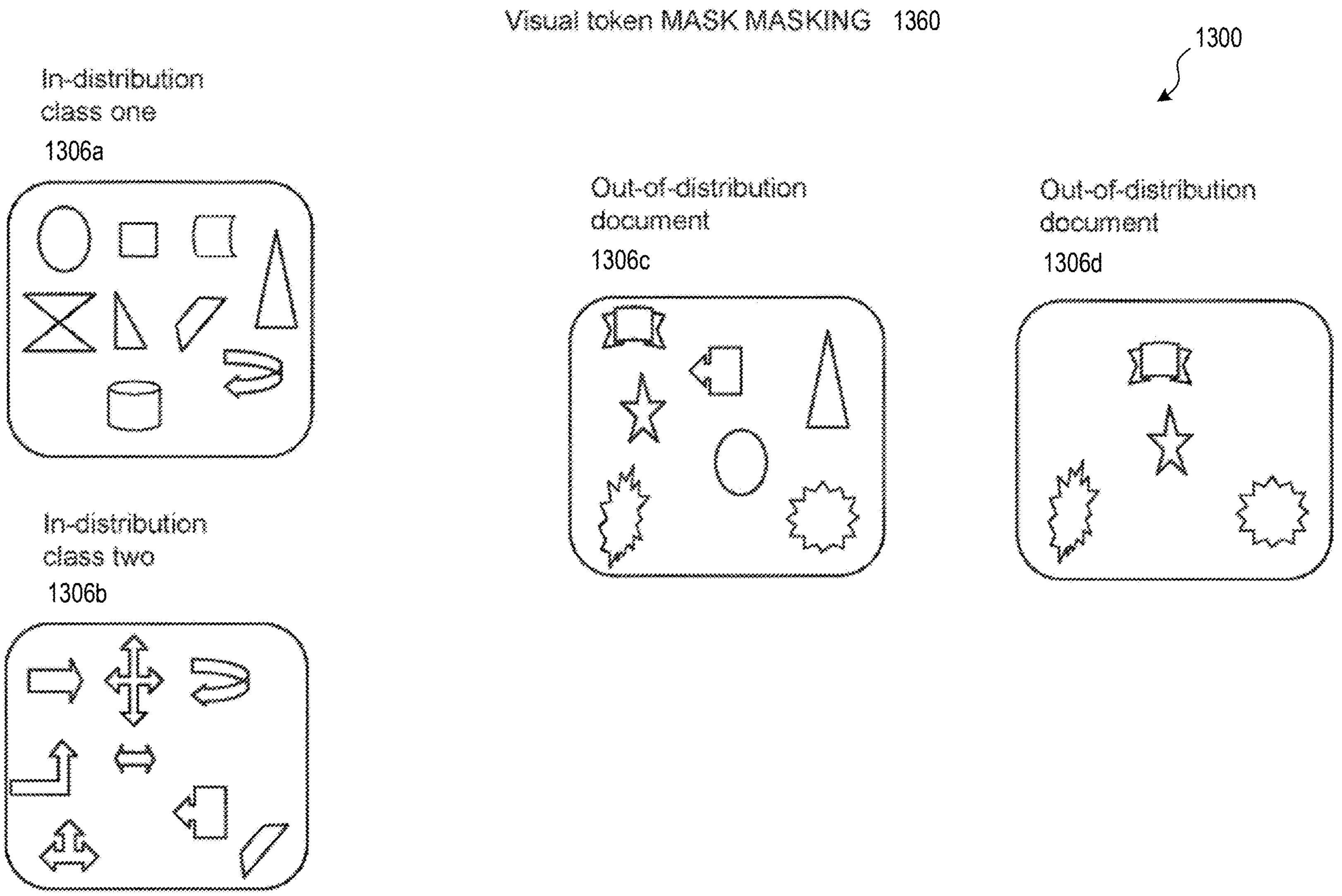
FIG. 13 illustrates an example of visual token mask masking.

FIG. 13 illustrates an example 1300 of visual token mask masking, in accordance with an implementation. In at least one implementation, this visual token masking includes in-distribution class one 1306A, in-distribution class two 1306B, out-of-distribution document 1306C, and out-of-distribution document 1306D that are used to train a machine learning model to distinguish between an in-domain document and out-of-distribution document (or outlier document). Each of the in-distribution class one 1306A, the in-distribution class two 1306B, the out-of-distribution document 1306C, and the out-of-distribution document 1306D include various shapes (e.g., an oval, a square, and a triangle) that represent features (e.g., tokens) of documents, such as training data 1106 and/or documents 1108 in FIG. 11, that are to be translated into dense vector embeddings for training the machine learning model.

In at least one implementation, an out-of-distribution prediction engine may translate each of the features of the in-distribution class one 1306A and the features of the in-distribution class two 1306B into a dense vector that is used to train a machine learning model. In at least one implementation, in-distribution class one 1306A represents a document including features that correspond to a classification of a document that is in-domain or alternatively known as in-distribution. As an example, this classification may identify a document as a passport. In at least one implementation, in-distribution class two 1306B represents a document including features that correspond to a different classification of another document that is in-domain. In this example, this different classification may identify a document as a national identification.

In at least one implementation, the out-of-distribution prediction engine may translate each of the features of the out-of-distribution document 1306C and the features of the out-of-distribution document 1306D into a dense vector that is used to train a machine learning model. In at least one implementation, the out-of-distribution document 1006C represents a document including features that correspond to a document that is out-of-distribution. As an example, the out-of-distribution document 1006C may be used as input to a machine learning model that outputs a prediction that this out-of-distribution document 1006C is not in-domain. In at least one implementation, out-of-distribution document 1006D represents another document including a different set of features that correspond to a document that is out-of-distribution.

In at least one implementation, the in-distribution class one 1006A and the in-distribution class two 1006B represent documents of in-domain data. For example, in-domain data may be data that a machine learning model is being trained to classify (e.g., passports versus a national identity document). In at least one implementation, the out-of-distribution document 1006C and out-of-distribution document 1006D represent a "foreign" or unknown document relative to the in-domain documents that the machine learning model is being trained to classify. In at least one implementation, as a result of the masking, the machine learning model may be more robust at identifying in-domain documents (e.g., in-distribution class one 1006A and the in-distribution class two 1006B). For example, the machine learning model is able to classify documents as in-domain or in-distribution that have more similar features to the original in-distribution documents used to train the model than to the original out-of-distribution documents (used to train the model).

In at least one implementation, a processor of the out-of-distribution prediction engine masks image data during training to make the machine learning model more robust to a variety of features, such as described above. In at least one implementation, the processor masks image data of input data (e.g., a passport or national identity document) during inferencing.

In at least one implementation, parts, methods, and/or systems described in connection with FIG. 13 are as further illustrated nonexclusively in any of FIGS. 11-18.

Figure 14:
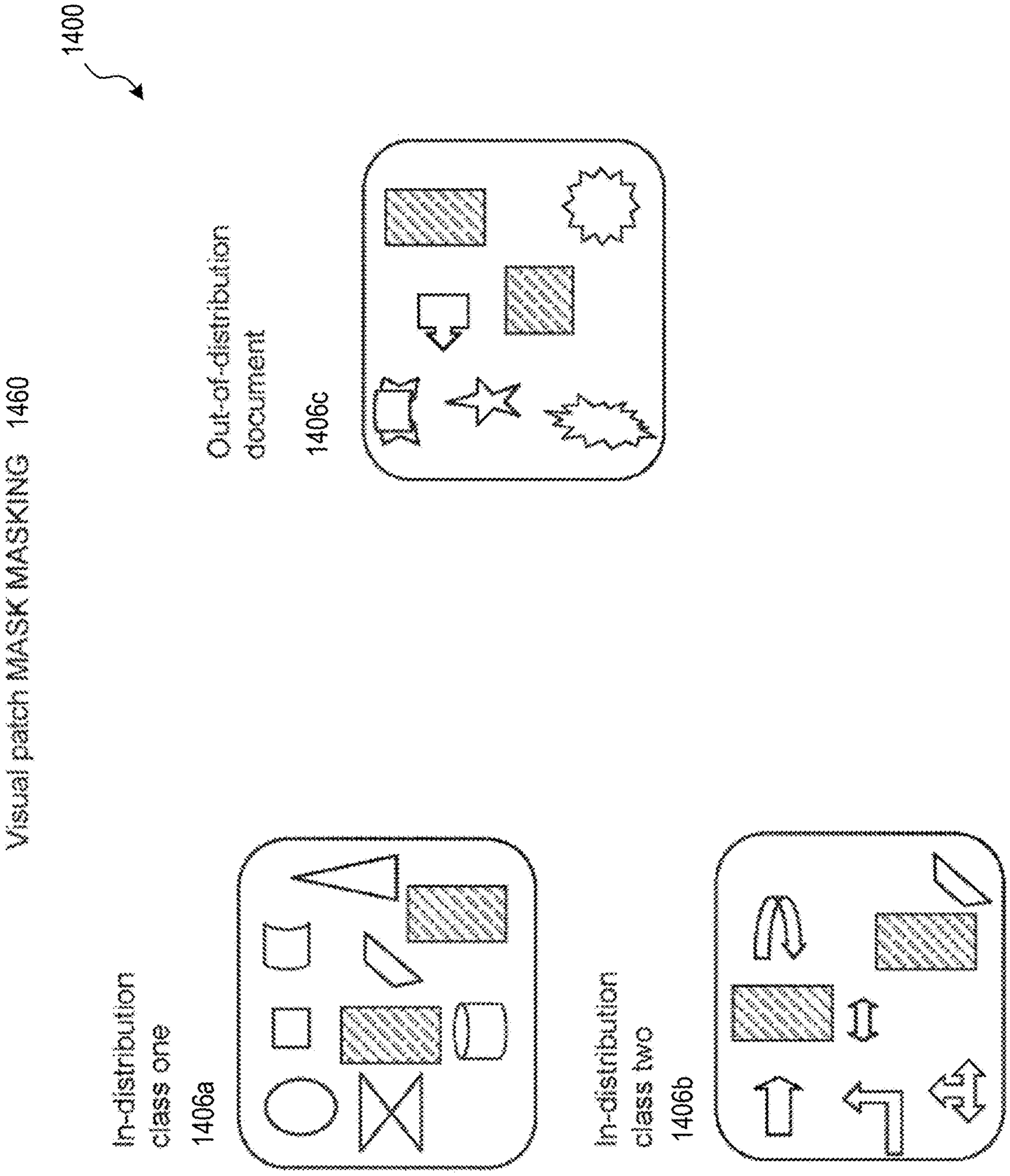
FIG. 14 illustrates an example of visual patch mask masking.

FIG. 14 illustrates an example 1400 of visual patch mask masking, in accordance with an implementation. In at least one implementation, this visual patch mask masking includes in-distribution class one 1406A, in-distribution class two 1406B, and out-of-distribution document 1406C that are used to train a machine learning model to distinguish between an in-domain document and out-of-distribution document or outlier document. Each of the in-distribution class one 1406A, the in-distribution class two 1406B, and the out-of-distribution document 1406C includes various shapes that represent features (e.g., tokens) of documents, and some of the shapes are overlaid with a "patch" to mask or omit the corresponding features from those features to be used for training the machine learning model. In at least one implementation, each feature map pixel may be a token. In at least one implementation, the patch that overlays one or more features of a training document or document to be classified is a computer-generated geometric shape. In at least one implementation, the computer-generated shape obfuscates one or more features of a training document or document to be classified by the machine learning model. In at least one implementation, the system translates the features into dense vector embeddings for training the machine learning model, the features lacking those that were omitted by using the patch mask masking.

In at least one implementation, the out-of-distribution prediction engine may translate each of the features of the in-distribution class one 1406A and the features of the in-distribution class two 1406B into a dense vector that is used to train the machine learning model. In at least one implementation, the system used masking of features in training documents (and documents for inferencing, not shown in FIG. 14) to increase the distance between learned dense embeddings of out-of-distribution data from in-distribution data. In at least one implementation, masking the features that resemble an oval and an equilateral triangle in out-of-distribution document 1406C results in in-distribution classes and out-of-distribution documents that do not share any features in common. In at least one implementation, the system omits or masks features in documents for training machine learning models to create more robust trained machine learning models. In at least one implementation, in-distribution class one 1406A represents a document including features that correspond to a classification of a document that is in-domain. In at least one implementation, in-distribution class two 1406B represents a document including features that correspond to a different classification of another document that is in-domain.

Not shown in FIGS. 13 and 14 is token "text" masking. For example, the features (e.g., shapes) may represent tokens from a random sentence to be used in an array. In at least one implementation, token text matching may implement feature extraction and feature masking to train a machine learning model to distinguish in-domain documents from out-of-domain documents. In at least one implementation, the system performs image patch masking and text token matching simultaneously during training of the machine learning model. The simultaneous patch and text token masking allows for more separation in the extracted dense vectors between the in-domain and out-of-distribution data, as out-of-distribution data is dissimilar to the in-domain data and thus has less relevant features. In at least one implementation, token text masking comprises attention masking to inform the machine learning model which tokens are padding and which tokens are to be processed.

In at least one implementation, a processor of a computer system of the out-of-distribution prediction engine, such as out-of-distribution prediction engine 1140 in FIG. 11, may perform masking of image data or text image (not shown in FIG. 13 or 14). In at least one implementation, parts, methods, and/or systems described in connection with FIG. 14 are as further illustrated nonexclusively in any of FIGS. 11-18.

Figure 15:
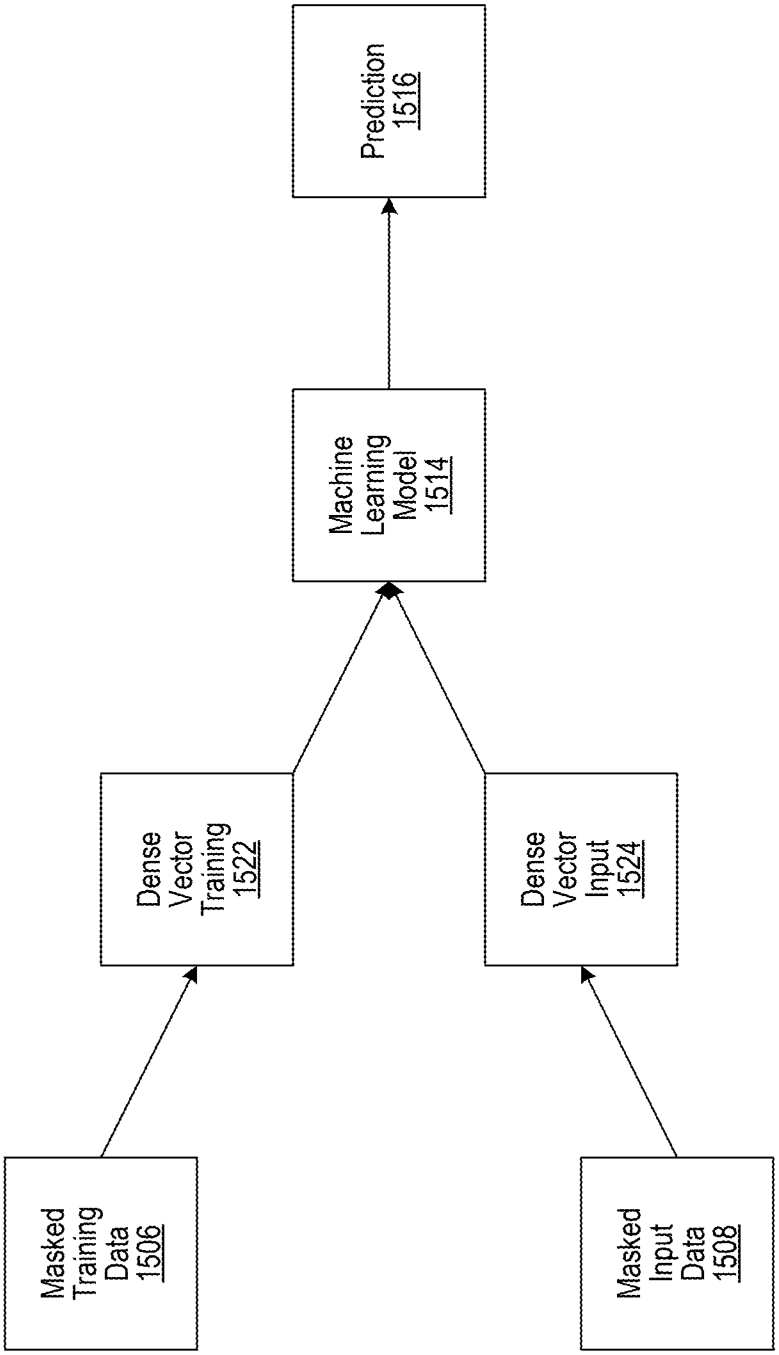
FIG. 15 illustrates an example environment of the out-of-distribution prediction engine of the data management platform of FIG. 1.

FIG. 15 illustrates an example 1500 of an out-of-distribution (and outlier) prediction system, in accordance with an implementation. In at least one implementation, this out-of-distribution prediction engine, which is similar to out-of-distribution prediction engine 1140 in FIG. 11, includes masked training data 1506 and masked input data 1508 that are translated into dense vector embeddings, such as dense vector training (data) 1522 and dense vector input (data) 1524, which are used to train a machine learning model 1514. In at least one implementation, the machine learning model generates a prediction 1516 of whether a document or input data is an in-domain document and out-of-distribution document or outlier document.

In at least one implementation, the system performs masked feature learning to train a machine learning model to detect out-of-distribution documents or outlier documents. In at least one implementation, the system extracts a set of features from a training document, such as training data 1106 in FIG. 11, to generate the masked training data 1506. As described above, the system may perform visual token masking, visual patch masking, and token text masking to perform contrastive learning techniques. For example, contrastive learning is a deep learning technique using contrasting data samples against each other to learn attributes that are common between data classifications and attributes that set apart a data classification from others (e.g., a representation of data with similar instances being close together in a distribution space and dissimilar instances are set far apart).

In at least one implementation, as a result of performing feature masking, the system generates the masked training data 1506. In at least one implementation, the masked training data 1506 may include features from pixel image data, plaintext data, or layout data or a combination of either image, plaintext, or layout data. In at least one implementation, these features include a set of features that result from omitting some features from both in-distribution training documents and out-of-distribution documents. In at least one implementation, some features that are omitted from training material to generate the masked training data 1506 may include features that are common to both in-distribution training documents and out-of-distribution documents. For example, if some of these features that are common, to both in-distribution and out-of-distribution documents, were left in the training material, it may serve little purpose in learning contrasting features of various classifications of training documents.

In at least one implementation, the system translates the masked training data 1506 into dense vector training data 1522 to train the machine learning model 1514. In at least one implementation, the dense vector training data 1522 may be an array of numbers with each element having a significant value. For example, in a random sentence, each word will have a significant value represented in a dense vector and may be used to learn other words in the sentence ("neighbors"). In at least one implementation, a training document (or input document) that may include plaintext data, image data, or layout data (or combination thereof) goes through an embedding layer and is converted into this dense vector training 1552, alternatively known as a dense embedding vector. In at least one implementation, the masked training data 1506 includes features of a training document that are concatenated together to generate the dense vector training data 1522. In at least one implementation, the dense (embedding) vector training data 1522 is encoded and processed in the machine learning model 1514.

In at least one implementation, the dense vector training data 1522 may be a training forward propagation used to train the machine learning model 1514. In at least one implementation, the training forward propagation may include a storage of variables for input to the machine learning model 1514. In at least one implementation, the training forward propagation may include output of the machine learning model 1514.

In at least one implementation, the system extracts a set of features from an input document to generate the masked training data 1506. The input document is similar to documents 1108 in FIG. 11 and documents 1208 in FIG. 12. In at least one implementation, the system receives the input document to be processed by the machine learning model 1514 to generate the prediction 1516. In at least one implementation, the system translates the masked input data 1508 into dense vector input data 1524 to be used by the machine learning model 1514 to generate an inference. Here, the machine learning model 1514 generates a prediction 1516 of whether the input document is an in-distribution or out-of-distribution document. In at least one implementation, the dense vector input data 1524 is similar to the dense vector training data 1522, described above.

In at least one implementation, the prediction 1516 is an output of the machine learning model 1514. In at least one implementation, the prediction 1516 may be a classification of an input document, such as documents 1108 in FIG. 11, that the machine learning model is trained to classify. In at least one implementation, the prediction 1516 may be generated by the machine learning model 1514 by using a threshold value on model confidence scores as a decision boundary to classify an unknown document into in-domain or out-of-distribution. The confidence scores may be generated during training of the machine learning model. In at least one implementation, the prediction 1516 may generated by calculating a distance score according to a Mahalanobis distance method, such as by calculating the distance between an extracted dense vector, such as dense vector input data 1524 of the document associated with the masked input data 1508 and classification conditional Gaussian distributions learned by the machine learning model 1514 during training. In at least one implementation, the prediction 1516 is generated by using a combination of the threshold value of the confidence scores and the distance score.

In at least one implementation, parts, methods, and/or systems described in connection with FIG. 15 are as further illustrated nonexclusively in any of FIGS. 11-18.

FIG. 16 is flowchart illustrating an example of an out-of-distribution prediction engine that trains a machine learning model to identify whether a data object is out-of-distribution, in accordance with an implementation. Some or all of the process 1600 (or any other processes described or variations and/or combinations of those processes) may be performed by one or more computer systems configured with executable instructions and/or other data and may be implemented as executable instructions executing collectively on one or more processors. The executable instructions and/or other data may be stored on a non-transitory, computer-readable storage medium (e.g., a computer program persistently stored on magnetic, optical, or flash media). For example, some or all of process 1600 may be performed by any suitable system, such as the computing device 1800 of FIG. 18. The process 1600 includes a series of operations wherein the system is performing process 1600 to extract features from a training document, select features to mask from the training document to create masked training data, and train a machine learning model using the masked training data to detect an out-of-distribution document.

In 1602, in at least one implementation, one or more processors of the out-of-distribution prediction engine, or alternatively known as a computing system or system, extract features from a training document for training a machine learning model. In at least one implementation, the features are extracted from the training document using a feature extraction module such as the feature extraction module 1110 in FIG. 11. In at least one implementation, the features may include plaintext, image, and/or layout data.

In 1604, in at least one implementation, one or more processors of the out-of-distribution prediction engine select a subset of features to omit from a training forward propagation. In at least one implementation, the one or more processors select the subset of features from the set of features extracted from the training document. In at least one implementation, the subset of features to omit or mask may be determined based on a pseudorandom process. In at least one implementation, a pseudorandom process to omit features may include masking plaintext data, input data, layout data, or a combination thereof in a stochastically distributed manner. In at least one implementation, the pseudorandom process to omit features includes pseudorandomly determining data in a training document to mask for training the machine learning model. In at least one implementation, the pseudorandom process to omit features includes pseudorandomly determining data in a document to mask that is to be classified during inferencing operations. In at least one implementation, the pseudorandom process to omit features includes pseudorandomly determining data to mask in training operations of the machine learning model and in inferencing operations of the machine learning model. In this disclosure, for example, the system masks different parts of a document in a statistically random manner so that masking performed over time results in predictions of documents with features that are expected for a given in-domain classification and remaining features are unknown, creating greater separation between in-domain and out-of-distribution data.

In some implementations, the pseudorandom process to omit features results in more robust predictions of in-domain documents by training the machine learning model within domain documents that have much more relevant features (for what the model is trained to predict) than out-of-distribution documents. In some implementations, the pseudorandom process to omit features includes pseudorandomly selecting features to mask that are common to in-domain and out-of-distribution documents. For example, to train a model to predict whether a document is a passport or a national identification (both in-domain classifications), the system may mask features of name and date of birth, which are features also found in a driver's license that, in this example, is out-of-distribution. This masking of common features would result in a greater separation between features remaining in "in-domain" documents and features in out-of-distribution documents that are irrelevant for passports or national identifications (e.g., a license #, a medical condition, or if the person is registered as an organ donor.)

In at least one implementation, the subset of features to omit may be determined based on selecting features of a training document or new document (e.g., input data) at a consistent (e.g., approximately the same) location in the documents. In at least one implementation, the subset of features to omit may be determined by using a percentage or number (e.g., a parameter) specified by a user, client device, computer system, hardware, or software application of the system.

In 1606, in at least one implementation, one or more processors of the out-of-distribution prediction engine train the machine learning model to produce a trained machine learning model, by using another subset of the features, from the training document, in the training forward propagation. In at least one implementation, the other subset of the features is different from the subset of features that is omitted from the training forward propagation (e.g., the other subset of features is disjoint from the omitted subset of features). In some implementations, a subset of features is disjoint from another subset of features when neither of the subsets has any features in common. In some implementations, the subset of features is disjoint from another subset of features if there is no "intersection" or "overlap" between the two subsets of features. For example, a set of features {1, 3, 5, 7} is disjoint from another set of features {2, 4, 6, 8}, as none of the features or elements of the two sets of features are in common. In at least one implementation, a training forward propagation includes a process of passing ("propagating") input data through a network (e.g., neural network) and generating an output (e.g., prediction). In at least one implementation, the trained machine learning model outputs information usable to classify documents, such as documents 1108 in FIG. 11. In at least one implementation, the trained machine learning model outputs information usable to differentiate between an out-of-distribution document and an in-distribution document (alternatively known as an in-domain document). In at least one implementation, the system trains the machine learning model using a masked training document to produce a trained machine learning model.

The dashed line indicates a separation in the process 1600 between training the machine learning model and using the machine learning model.

In 1608, in at least one implementation, one or more processors of the out-of-distribution prediction engine receive a document as input data to the machine learning model. In at least one implementation, a processor of the out-of-distribution prediction engine performs operations to mask at least a portion of the input data to produce a masked input data. In at least one implementation, the processor performs operations to provide the masked input data to the trained machine learning model as input.

In 1610, in at least one implementation, one or more processors of the out-of-distribution prediction engine perform operations to receive a classification of the document as an output of the machine learning model. In at least one implementation, the classification is generated by the system extracting a dense vector embedding of the document, comparing it to an in-domain dense vector embedding to obtain a confidence score and then comparing that confidence score to a threshold value of confidence scores, obtained during the training of the machine learning model.

In 1612, in at least one implementation, one or more processors of the out-of-distribution prediction engine perform instructions to determine that the document is an out-of-distribution document. In at least one implementation, the processor may perform operations to cause the out-of-distribution document to be sent for manual review. In at least one implementation, the manual review may be performed by a user of the out-of-distribution prediction engine, such as user 1102 in FIG. 11, or by any entity designated as an in-domain data expert.

In at least one implementation, parts, methods, and/or systems described in connection with FIG. 16 are as further illustrated nonexclusively in any FIGS. 11-18. Note that one or more of the operations performed in 1602-14 may be performed in various orders and combinations, including in parallel.

Note that, in the context of describing disclosed implementations, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Example Implementation of the AI Models of the Data Management Platform

Figure 17:
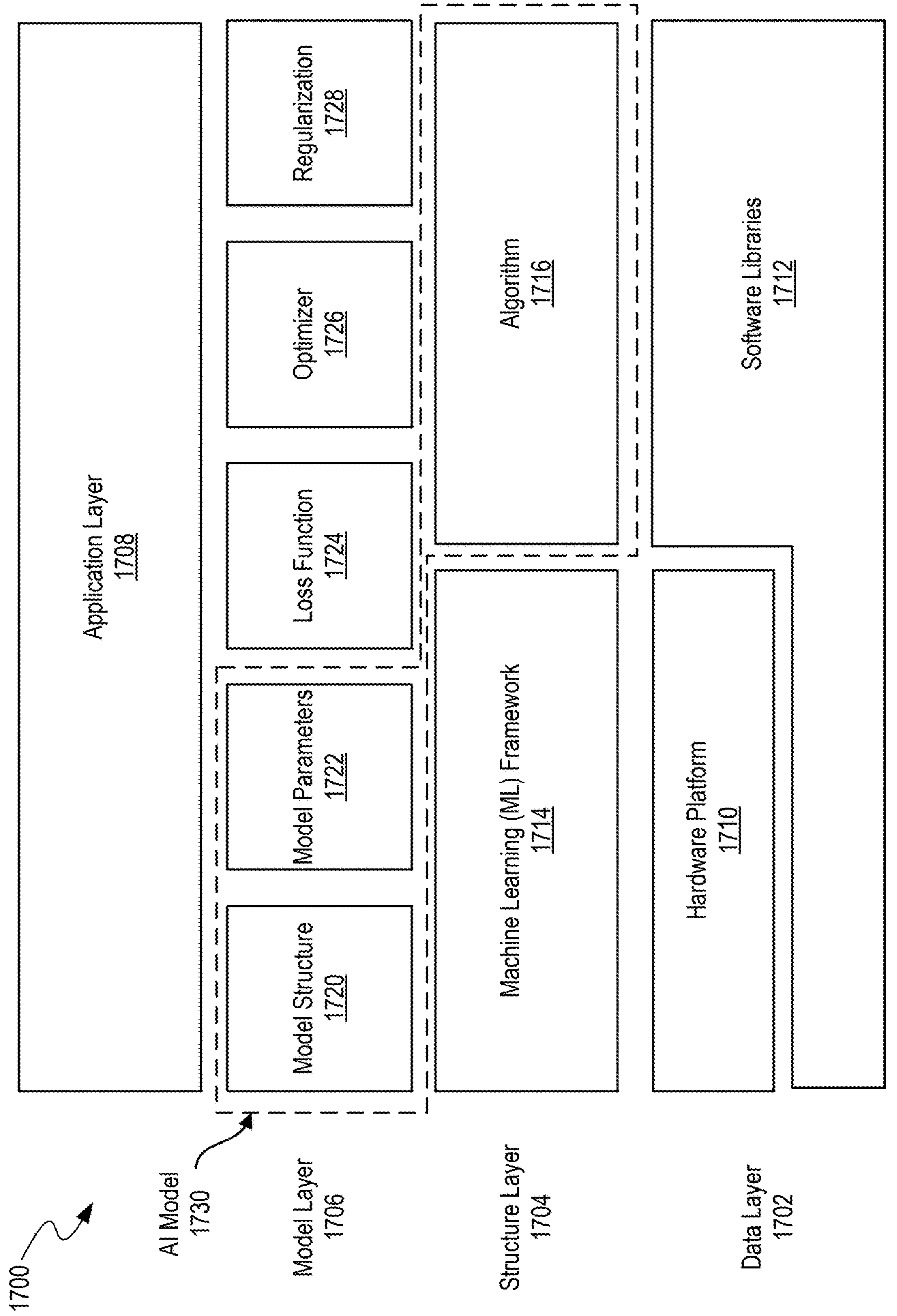
FIG. 17 illustrates a layered architecture of an artificial intelligence (AI) model system that can implement the machine learning models of the data management platform of FIG. 1.

FIG. 17 illustrates a layered architecture of an AI system 1700 that can implement the ML models of the data management platform 104 of FIG. 1, in accordance with some implementations of the present technology. Example ML models can include the models executed by the data management platform 104, such as remediation models, anomaly detection models, and so forth. Accordingly, the AI models of the data management platform 104 can include one or more components of the AI system 1700.

As shown, the AI system 1700 can include a set of layers, which conceptually organize elements within an example network topology for the AI system's architecture to implement a particular AI model. Generally, an AI model is a computer-executable program implemented by the AI system 1700 that analyzes data to make predictions. Information can pass through each layer of the AI system 1700 to generate outputs for the AI model. The layers can include a data layer 1702, a structure layer 1704, a model layer 1706, and an application layer 1708. The algorithm 1716 of the structure layer 1704 and the model structure 1720 and model parameters 1722 of the model layer 1706 together form an example AI model. The optimizer 1726, loss function engine 1724, and regularization engine 1728 work to refine and optimize the AI model, and the data layer 1702 provides resources and support for application of the AI model by the application layer 1708.

The data layer 1702 acts as the foundation of the AI system 1700 by preparing data for the AI model. As shown, the data layer 1702 can include two sub-layers: a hardware platform 1710 and one or more software libraries 1712. The hardware platform 1710 can be designed to perform operations for the AI model and include computing resources for storage, memory, logic and networking, such as the resources described in relation to FIGS. 18 and 12. The hardware platform 1710 can process amounts of data using one or more servers. The servers can perform backend operations such as matrix calculations, parallel calculations, machine learning (ML) training, and the like. Examples of servers used by the hardware platform 1710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1710 can include computing resources (e.g., servers, memory, etc.) offered by a cloud services provider. The hardware platform 1710 can also include computer memory for storing data about the AI model, application of the AI model, and training data for the AI model. The computer memory can be a form of random-access memory (RAM), such as dynamic RAM, static RAM, and non-volatile RAM.

The software libraries 1712 can be thought of as suites of data and programming code, including executables, used to control the computing resources of the hardware platform 1710. The programming code can include low-level primitives (e.g., fundamental language elements) that form the foundation of one or more low-level programming languages, such that servers of the hardware platform 1710 can use the low-level primitives to carry out specific operations. The low-level programming languages do not require much, if any, abstraction from a computing resource's instruction set architecture, enabling them to run quickly with a small memory footprint. Examples of software libraries 1712 that can be included in the AI system 1700 include INTEL Math Kernel Library, NVIDIA cuDNN, EIGEN, and OpenBLAS.

The structure layer 1704 can include an ML framework 1714 and an algorithm 1716. The ML framework 1714 can be thought of as an interface, library, or tool that enables users to build and deploy the AI model. The ML framework 1714 can include an open-source library, an API, a gradient-boosting library, an ensemble method, and/or a deep learning toolkit that work with the layers of the AI system to facilitate development of the AI model. For example, the ML framework 1714 can distribute processes for application or training of the AI model across multiple resources in the hardware platform 1710. The ML framework 1714 can also include a set of pre-built components that have the functionality to implement and train the AI model and enable users to use pre-built functions and classes to construct and train the AI model. Thus, the ML framework 1714 can be used to facilitate data engineering, development, hyperparameter tuning, testing, and training for the AI model. Examples of ML frameworks 1714 that can be used in the AI system 1700 include TENSORFLOW, PYTORCH, SCIKIT-LEARN, KERAS, LightGBM, RANDOM FOREST, and AMAZON WEB SERVICES.

The algorithm 1716 can be an organized set of computer-executable operations used to generate output data from a set of input data and can be described using pseudocode. The algorithm 1716 can include complex code that enables the computing resources to learn from new input data and create new/modified outputs based on what was learned. In some implementations, the algorithm 1716 can build the AI model through being trained while running computing resources of the hardware platform 1710. This training enables the algorithm 1716 to make predictions or decisions without being explicitly programmed to do so. Once trained, the algorithm 1716 can run at the computing resources as part of the AI model to make predictions or decisions, improve computing resource performance, or perform tasks. The algorithm 1716 can be trained using supervised learning, unsupervised learning, semi-supervised learning, and/or reinforcement learning.

Using supervised learning, the algorithm 1716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of dataset 102 in FIG. 1) from various source computing systems described in relation to FIG. 1. Furthermore, training data can include pre-processed data generated by various engines of the data management platform 104 described in relation to FIG. 1. The user may label the training data based on one or more classes and trains the AI model by inputting the training data to the algorithm 1716. The algorithm determines how to label the new data based on the labeled training data. The user can facilitate collection, labeling, and/or input via the ML framework 1714. In some instances, the user may convert the training data to a set of feature vectors for input to the algorithm 1716. Once trained, the user can test the algorithm 1716 on new data to determine if the algorithm 1716 is predicting accurate labels for the new data. For example, the user can use cross-validation methods to test the accuracy of the algorithm 1716 and retrain the algorithm 1716 on new training data if the results of the cross-validation are below an accuracy threshold.

Supervised learning can include classification and/or regression. Classification techniques include teaching the algorithm 1716 to identify a category of new observations based on training data and are used when input data for the algorithm 1716 is discrete. Said differently, when learning through classification techniques, the algorithm 1716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1716 is continuous. Regression techniques can be used to train the algorithm 1716 to predict or forecast relationships between variables. To train the algorithm 1716 using regression techniques, a user can select a regression method for estimating the parameters of the model. The user collects and labels training data that is input to the algorithm 1716 such that the algorithm 1716 is trained to understand the relationship between data features and the dependent variable(s). Once trained, the algorithm 1716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 1716 learns patterns from unlabeled training data. In particular, the algorithm 1716 is trained to learn hidden patterns and insights of input data, which can be used for data exploration or for generating new data. Here, the algorithm 1716 does not have a predefined output, unlike the labels output when the algorithm 1716 is trained using supervised learning. Said another way, unsupervised learning is used to train the algorithm 1716 to find an underlying structure of a set of data, group the data according to similarities, and represent that set of data in a compressed format. The data management platform 104 can use unsupervised learning to identify patterns in claim history (e.g., to identify particular event sequences) and so forth. In some implementations, performance of the AI models of the data management platform that can use unsupervised learning is improved because the incoming dataset 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 1716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1716 may be trained to be an Isolation Forest, local outlier factor (LOF) algorithm, or k-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1716 include factor analysis, item response theory, latent profile analysis, and latent class analysis.

The model layer 1706 implements the AI model using data from the data layer and the algorithm 1716 and ML framework 1714 from the structure layer 1704, thus enabling decision-making capabilities of the AI system 1700. The model layer 1706 includes a model structure 1720, model parameters 1722, a loss function engine 1724, an optimizer 1726, and a regularization engine 1728.

The model structure 1720 describes the architecture of the AI model of the AI system 1700. The model structure 1720 defines the complexity of the pattern/relationship that the AI model expresses. Examples of structures that can be used as the model structure 1720 include decision trees, support vector machines, regression analyses, Bayesian networks, Gaussian processes, genetic algorithms, and artificial neural networks (or, simply, neural networks). The model structure 1720 can include a number of structure layers, a number of nodes (or neurons) at each structure layer, and activation functions of each node. Each node's activation function defines how to node converts data received to data output. The structure layers may include an input layer of nodes that receive input data and an output layer of nodes that produce output data. The model structure 1720 may include one or more hidden layers of nodes between the input and output layers. The model structure 1720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1722 represent the relationships learned during training and can be used to make predictions and decisions based on input data. The model parameters 1722 can weight and bias the nodes and connections of the model structure 1720. For instance, when the model structure 1720 is a neural network, the model parameters 1722 can weight and bias the nodes in each layer of the neural networks, such that the weights determine the strength of the nodes and the biases determine the thresholds for the activation functions of each node. The model parameters 1722, in conjunction with the activation functions of the nodes, determine how input data is transformed into desired outputs. The model parameters 1722 can be determined and/or altered during training of the algorithm 1716.

The loss function engine 1724 can determine a loss function, which is a metric used to evaluate the AI model's performance during training. For instance, the loss function engine 1724 can measure the difference between a predicted output of the AI model and the actual output of the AI model and is used to guide optimization of the AI model during training to minimize the loss function. The loss function may be presented via the ML framework 1714, such that a user can determine whether to retrain or otherwise alter the algorithm 1716 if the loss function is over a threshold. In some instances, the algorithm 1716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1726 adjusts the model parameters 1722 to minimize the loss function during training of the algorithm 1716. In other words, the optimizer 1726 uses the loss function generated by the loss function engine 1724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 1726 used may be determined based on the type of model structure 1720 and the size of data and the computing resources available in the data layer 1702.

The regularization engine 1728 executes regularization operations. Regularization is a technique that prevents over- and under-fitting of the AI model. Overfitting occurs when the algorithm 1716 is overly complex and too adapted to the training data, which can result in poor performance of the AI model. Under-fitting occurs when the algorithm 1716 is unable to recognize even basic patterns from the training data such that it cannot perform well on training data or on validation data. The optimizer 1726 can apply one or more regularization techniques to fit the algorithm 1716 to the training data properly, which helps constrain the resulting AI model and improves its ability for generalized application. Examples of regularization techniques include lasso (L1) regularization, ridge (L2) regularization, and elastic (L1 and L2) regularization.

The application layer 1708 describes how the AI system 1700 is used to solve problems or perform tasks. In an example implementation, the application layer 1708 can include a front-end user interface of the data management platform 104.

Example Computing Environment of the Data Management Platform

Figure 18:
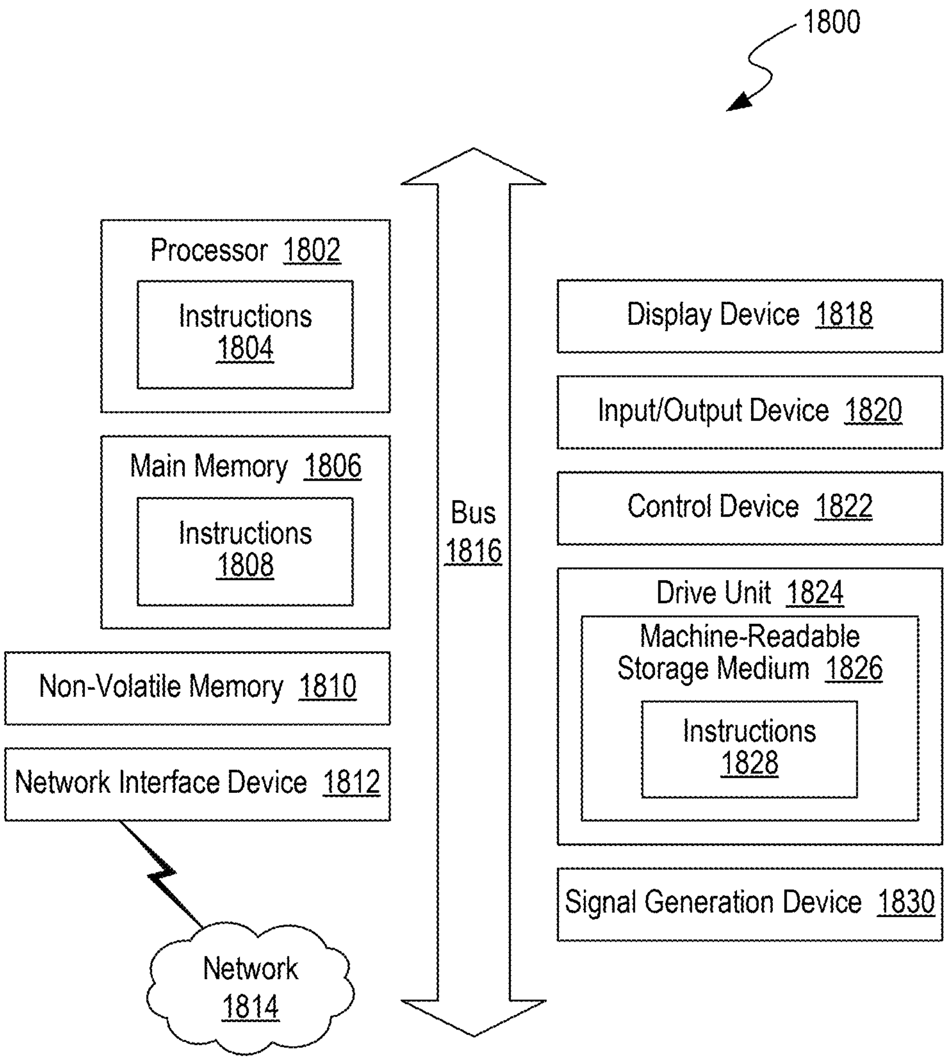
FIG. 18 is a block diagram showing some of the components typically incorporated in at least some of the computer systems and other devices on which the data management platform of FIG. 1 operates.

FIG. 18 is a block diagram showing some of the components typically incorporated in at least some of the computer systems and other devices 1800 on which the disclosed system operates in accordance with some implementations of the present technology. As shown, an example computer system 1800 can include one or more processors 1802, main memory 1808, non-volatile memory 1812, a network interface device 1814, video display device 1820, an input/output device 1822, a control device 1824 (e.g., keyboard and pointing device), a drive unit 1826 that includes a machine-readable medium 1828, and a signal generation device 1832 that are communicatively connected to a bus 1818. The bus 1818 represents one or more physical buses and/or point-to-point connections that are connected by appropriate bridges, adapters, or controllers. Various common components (e.g., cache memory) are omitted from FIG. 18 for brevity. Instead, the computer system 1800 is intended to illustrate a hardware device on which components illustrated or described relative to the examples of the figures and any other components described in this specification can be implemented.

The computer system 1800 can take any suitable physical form. For example, the computer system 1800 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1800. In some implementations, the computer system 1800 can be an embedded computer system, a system-on-chip (SOC), a single-board computer system (SBC), or a distributed system such as a mesh of computer systems, or it can include one or more cloud components in one or more networks. Where appropriate, one or more computer systems 1800 can perform operations in real time, in near real time, or in batch mode.

The network interface device 1814 enables the computer system 1800 to exchange data in a network 1816 with an entity that is external to the computing system 1800 through any communication protocol supported by the computer system 1800 and the external entity. Examples of the network interface device 1814 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1808, non-volatile memory 1812, machine-readable medium 1828) can be local, remote, or distributed. Although shown as a single medium, the machine-readable medium 1828 can include multiple media (e.g., a centralized/distributed database and/or associated caches and servers) that store one or more sets of instructions 1830. The machine-readable (storage) medium 1828 can include any medium that is capable of storing, encoding, or carrying a set of instructions for execution by the computer system 1800. The machine-readable medium 1828 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1810, 1830) set at various times in various memory and storage devices in computing device(s). When read and executed by the processor 1802, the instruction(s) cause the computer system 1800 to perform operations to execute elements involving the various aspects of the disclosure.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

obtain a dataset that comprises a plurality of content sets;

generate multiple data representations defining the plurality of content sets by:

linking each content set of the plurality of content sets into one or more clusters, and for each particular cluster, generate a respective data representation of the multiple data representations by summarizing respective content sets of the particular cluster;

identify, using a first artificial intelligence (AI) model set, at least one particular content set using a similarity value between the multiple data representations,
wherein the similarity value of the multiple data representations satisfies a constraint set;
generate, using a second AI model set, a reconfiguration command set configured to remove the at least one particular content set from the plurality of content sets; and
cause execution of the reconfiguration command set on the dataset to modify a portion of the dataset to remove the at least one particular content set from the plurality of content sets.

2. The system of claim 1, wherein the first AI model set is further configured to identify at least one content conflict between one or more pairs of data representations within the multiple data representations by:
linking a first data representation of the multiple data representations to (a) a topic and (b) a first information set,
linking a second data representation of the multiple data representations to (a) the topic and (b) a second information set, and
identify the content conflict between the first and second information sets by:
comparing the first and second information sets to determine a degree of similarity between the first and second information sets, and
determining that the degree of similarity fails one or more criterion.

3. The system of claim 1, wherein the system is further caused to:
cause transmission of a report indicating one or more of (a) the identified at least one particular content set or (b) the reconfiguration command set.

4. The system of claim 1, wherein the constraint set includes a threshold generated using a separate AI model that evaluates a degree of satisfaction of the threshold against a set of performance metrics.

5. The system of claim 1, wherein the at least one particular content set includes at least one duplicate content set.

6. A non-transitory computer-readable storage medium comprising instructions stored thereon, wherein the instructions when executed by at least one data processor of a system, cause the system to:
obtain a dataset that comprises a plurality of content sets;
determine multiple data representations defining the plurality of content sets by:
linking each content set of the plurality of content sets into one or more clusters, and
for each particular cluster, generate a respective data representation of the multiple data representations by summarizing respective content sets of the particular cluster;
identify, using a first artificial intelligence (AI) model set, at least one particular content set using a similarity value between the multiple data representations,
wherein the similarity value of the multiple data representations satisfies a constraint set;
generate, using a second AI model set, a reconfiguration command set configured to remove the at least one particular content set from the plurality of content sets; and
cause execution of the reconfiguration command set on the dataset to modify a portion of the dataset to remove the at least one particular content set from the plurality of content sets.

7. The non-transitory computer-readable storage medium of claim 6, wherein the reconfiguration command set is generated based on a predefined rule set.

8. The non-transitory computer-readable storage medium of claim 6, wherein one or more AI models in the first AI model set is an AI agent.

9. The non-transitory computer-readable storage medium of claim 6, wherein the instructions further cause the system to:
detect a data linkage between portions of the dataset based on the one or more clusters; and
generate a representation of the data linkage in a form of one or more of: a knowledge graph, a tree structure, or a table.

10. The non-transitory computer-readable storage medium of claim 6, wherein the instructions further cause the system to:
map one or more content sets within the dataset to one or more organizational references associated with an organization.

11. The non-transitory computer-readable storage medium of claim 6, wherein the instructions further cause the system to:
receive feedback via an interface; and
modify one or more reconfiguration commands within the reconfiguration command set in accordance with the feedback.

12. The non-transitory computer-readable storage medium of claim 6, wherein the constraint set is associated with a majority vote of multiple AI models within the second AI model set.

13. The non-transitory computer-readable storage medium of claim 6,
wherein the at least one particular content set comprises at least one content conflict between a first data representation and a second data representation, and
wherein the reconfiguration command set includes updating the first data representation or the second data representation.

14. A computer-implemented method comprising:
obtaining a dataset that comprises a plurality of content sets;
determining multiple data representations defining the plurality of content sets;
identifying, using a first artificial intelligence (AI) model set, at least one particular content set using a similarity value between the multiple data representations,
wherein the similarity value of the multiple data representations satisfies a constraint set;
generating, using a second AI model set, a reconfiguration command set configured to remove the at least one particular content set from the plurality of content sets; and
causing execution of the reconfiguration command set on the dataset to modify a portion of the dataset to remove the at least one particular content set from the plurality of content sets.

15. The computer-implemented method of claim 14, wherein at least one of the first AI model set or the second AI model set includes an agent.

16. The computer-implemented method of claim 14, wherein the at least one particular content set comprises at least one of a content conflict or a duplicate content.

17. The computer-implemented method of claim 14, further comprising:

generating a compliance report indicating a compliance status of the dataset with predefined criteria.

18. The computer-implemented method of claim 14, further comprising:

maintaining a history of one or more data modifications to the dataset, wherein each data modification is determined based on the modified portion of the dataset.

19. The computer-implemented method of claim 18, further comprising:

identifying one or more events associated with the at least one particular content set using one or more correlations between values of different data variables in the dataset.

20. The computer-implemented method of claim 14, wherein the modified portion of the dataset includes enriched data, and wherein the enriched data replaces one or more missing values within the dataset based on reference data sources.

* * * * *